United States Patent
Castañeda et al.

(10) Patent No.: US 11,138,301 B1
(45) Date of Patent: Oct. 5, 2021

(54) EYE SCANNER FOR USER IDENTIFICATION AND SECURITY IN AN EYEWEAR DEVICE

(71) Applicants: Julio Cesar Castañeda, Redondo Beach, CA (US); Rajeev Ramanath, Torrence, CA (US)

(72) Inventors: Julio Cesar Castañeda, Redondo Beach, CA (US); Rajeev Ramanath, Torrence, CA (US)

(73) Assignee: Snap Inc., Santa Monica, CA (US)

( * ) Notice: Subject to any disclaimer, the term of this patent is extended or adjusted under 35 U.S.C. 154(b) by 123 days.

(21) Appl. No.: 16/188,981

(22) Filed: Nov. 13, 2018

Related U.S. Application Data

(60) Provisional application No. 62/588,700, filed on Nov. 20, 2017.

(51) Int. Cl.
  *G06K 9/00* (2006.01)
  *G06F 21/32* (2013.01)
  *G02B 27/01* (2006.01)

(52) U.S. Cl.
  CPC ........... *G06F 21/32* (2013.01); *G02B 27/017* (2013.01); *G06K 9/00617* (2013.01)

(58) Field of Classification Search
  None
  See application file for complete search history.

(56) References Cited

U.S. PATENT DOCUMENTS

| | | | | |
|---|---|---|---|---|
| 7,925,887 B2 * | 4/2011 | Burton | ..................... | G06F 21/32 713/186 |
| 9,547,184 B2 * | 1/2017 | Howell | ..................... | G02C 5/14 |
| 9,576,399 B2 * | 2/2017 | Lo | ..................... | H04N 13/383 |
| 10,064,552 B1 * | 9/2018 | Vaziri | ..................... | H04N 7/22 |
| 10,319,148 B2 * | 6/2019 | Lo | ..................... | G02B 3/14 |
| 10,573,042 B2 * | 2/2020 | Kaehler | ............... | G06K 9/0061 |
| 10,650,605 B2 * | 5/2020 | Lo | ..................... | G02B 3/14 |
| 10,698,481 B1 * | 6/2020 | Najafi Shoushtari | ........................ | G06T 19/006 |
| 2007/0263908 A1 * | 11/2007 | Tsukahara | .......... | G06K 9/00604 382/117 |

(Continued)

OTHER PUBLICATIONS

Li et al., "An Accurate and Efficient User Authentication Mechanism on Smart Glasses Based on Iris Recognition", Hindawi Mobile Information Systems, vol. 2017, Article ID 1281020 (Year: 2017).*

*Primary Examiner* — Randolph I Chu
(74) *Attorney, Agent, or Firm* — Culhane Meadows PLLC; Stephen J. Weed

(57) ABSTRACT

A system comprises an eyewear device that includes a frame, a temple connected to a lateral side of the frame, an infrared emitter, and an infrared camera. The infrared emitter and the infrared camera are connected to the frame or the temple to emit a pattern of infrared light. The system includes a processor coupled to the eyewear device, a memory accessible to the processor, and programming in the memory. Execution of the programming by the processor configures the system to perform functions, including functions to emit, via the infrared emitter, a pattern of infrared light on an eye of a user of the eyewear device; capture, via the camera, reflection variations in the pattern of infrared light on the eye of the user; and identify a user of the eyewear device based on the reflection variations of the emitted pattern of infrared light on the eye of the user.

19 Claims, 14 Drawing Sheets

(56) References Cited

U.S. PATENT DOCUMENTS

| | | | | |
|---|---|---|---|---|
| 2012/0068913 A1* | 3/2012 | Bar-Zeev | G09G 3/001 | 345/8 |
| 2012/0294478 A1* | 11/2012 | Publicover | G02B 27/0093 | 382/103 |
| 2012/0326948 A1* | 12/2012 | Crocco | G02B 27/0172 | 345/7 |
| 2013/0154913 A1* | 6/2013 | Genc | G06F 3/013 | 345/156 |
| 2013/0242262 A1* | 9/2013 | Lewis | G02B 27/0093 | 351/209 |
| 2014/0055746 A1* | 2/2014 | Nistico | H04N 5/23219 | 351/206 |
| 2014/0112550 A1* | 4/2014 | Hanna | G06K 9/00892 | 382/117 |
| 2014/0285402 A1* | 9/2014 | Rahman | G02B 27/017 | 345/8 |
| 2014/0341441 A1* | 11/2014 | Slaby | G06F 21/32 | 382/117 |
| 2014/0361957 A1* | 12/2014 | Hua | G02B 17/086 | 345/8 |
| 2015/0084864 A1* | 3/2015 | Geiss | G06F 21/316 | 345/158 |
| 2015/0094914 A1* | 4/2015 | Abreu | B60H 1/00742 | 701/41 |
| 2015/0187330 A1* | 7/2015 | Yang | G09G 3/3648 | 345/690 |
| 2016/0011657 A1* | 1/2016 | Estacio | G06K 9/0061 | 345/156 |
| 2016/0050345 A1* | 2/2016 | Longbotham | G02B 27/017 | 348/47 |
| 2016/0091877 A1* | 3/2016 | Fullam | G06T 19/006 | 700/276 |
| 2016/0092731 A1* | 3/2016 | Dainty | G02B 13/004 | 348/78 |
| 2016/0139265 A1* | 5/2016 | Yahav | H04N 5/23219 | 356/51 |
| 2016/0260258 A1* | 9/2016 | Lo | H04N 13/383 | |
| 2016/0267708 A1* | 9/2016 | Nistico | G06F 3/167 | |
| 2016/0299569 A1* | 10/2016 | Fisher | G02B 27/0172 | |
| 2016/0380627 A1* | 12/2016 | Wyland | H03K 17/6877 | 327/434 |
| 2017/0112376 A1* | 4/2017 | Gill | A61B 3/14 | |
| 2017/0156589 A1* | 6/2017 | Wu | G02B 27/017 | |
| 2017/0161578 A1* | 6/2017 | Ivanisov | G06K 9/00604 | |
| 2017/0168566 A1* | 6/2017 | Osterhout | G06F 3/167 | |
| 2017/0316266 A1* | 11/2017 | Kawabata | G06K 9/00617 | |
| 2017/0324437 A1* | 11/2017 | Ruttler | A61B 5/02438 | |
| 2018/0028057 A1* | 2/2018 | Oz | A61B 3/085 | |
| 2018/0113216 A1* | 4/2018 | Kremer | G01S 17/42 | |
| 2018/0113508 A1* | 4/2018 | Berkner-Cieslicki | G02B 27/0172 | |
| 2018/0136465 A1* | 5/2018 | Chi | G02B 27/0172 | |
| 2018/0140187 A1* | 5/2018 | Watanabe | G06K 9/00604 | |
| 2018/0267604 A1* | 9/2018 | Bhattacharya | G06F 3/0346 | |
| 2018/0357916 A1* | 12/2018 | Breed | G06K 9/00604 | |
| 2019/0064922 A1* | 2/2019 | Price | G06F 3/013 | |
| 2019/0073533 A1* | 3/2019 | Chen | G06K 9/00604 | |
| 2019/0101980 A1* | 4/2019 | Stafford | G06F 3/013 | |
| 2019/0156134 A1* | 5/2019 | Krishnan | A61B 5/225 | |
| 2019/0167095 A1* | 6/2019 | Krueger | A61B 3/112 | |
| 2019/0250705 A1* | 8/2019 | Zhang | G06F 3/011 | |
| 2019/0324276 A1* | 10/2019 | Edwin | G09G 5/003 | |
| 2019/0385342 A1* | 12/2019 | Freeman | A61B 3/113 | |
| 2020/0085311 A1* | 3/2020 | Tzvieli | A61B 5/0075 | |
| 2020/0085312 A1* | 3/2020 | Tzvieli | A61B 5/7282 | |
| 2020/0150428 A1* | 5/2020 | Greenberg | G02C 11/10 | |
| 2020/0250872 A1* | 8/2020 | Kaehler | G06K 9/4671 | |

* cited by examiner

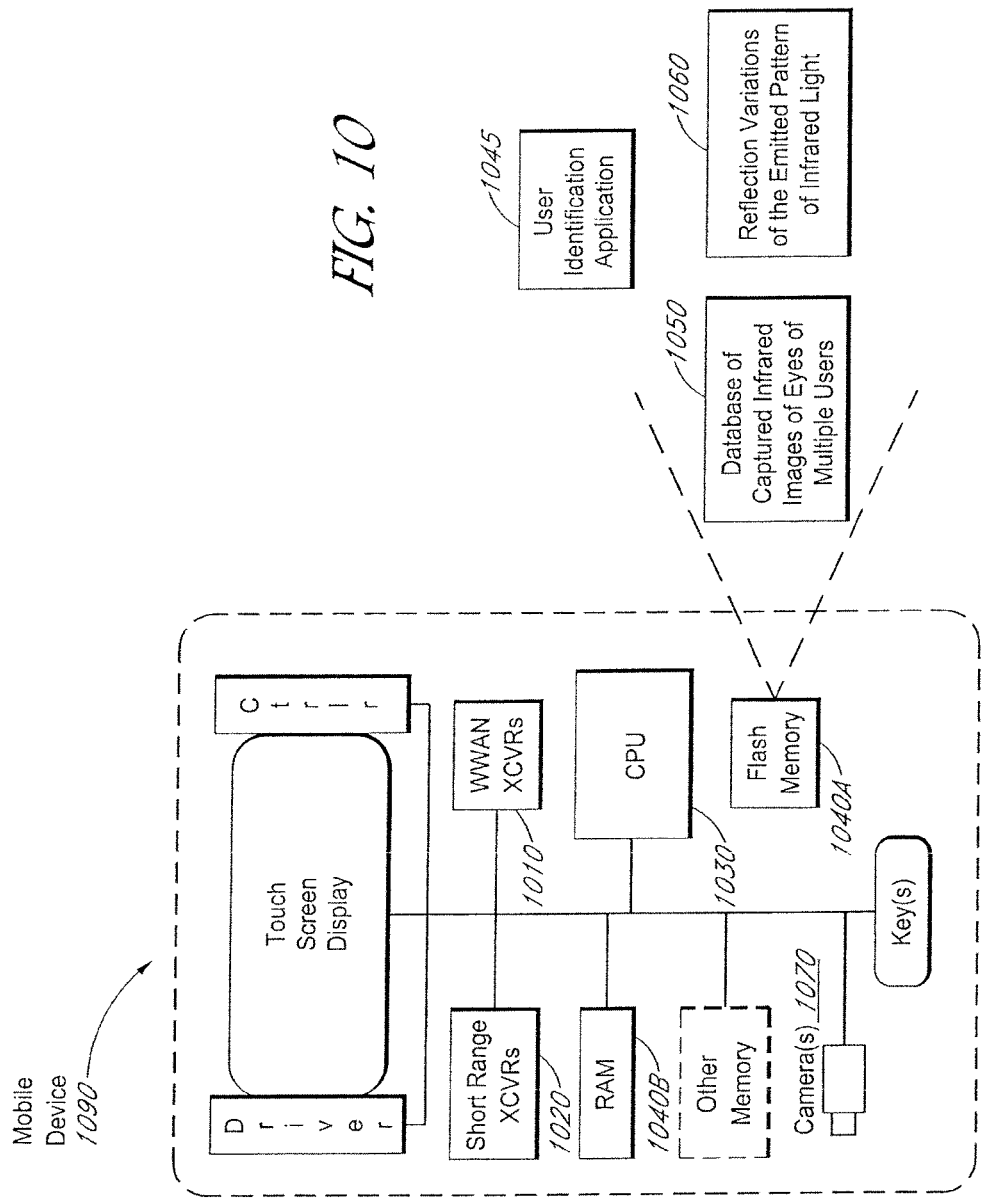

EYE SCANNER FOR USER IDENTIFICATION AND SECURITY IN AN EYEWEAR DEVICE

TECHNICAL FIELD

The present subject matter relates to eye scanners for an eyewear device, e.g., smart glasses, for user identification and security.

BACKGROUND

Portable eyewear devices, such as smartglasses, headwear, and headgear available today integrate cameras and displays. Users of such portable eyewear devices may share such eyewear devices with friends and family members so that any user can borrow the eyewear device to capture images with the integrated camera.

Verifying the identity of the specific user of the portable eyewear device can be useful. For example, as augmented reality becomes more prevalent in such eyewear devices applications may be developed that need to verify the identity of the user for security purposes.

BRIEF DESCRIPTION OF THE DRAWINGS

The drawing figures depict one or more implementations, by way of example only, not by way of limitations. In the figures, like reference numerals refer to the same or similar elements.

FIG. 10 shows an example of a hardware configuration for the mobile device of the user identification system of FIG. 9, in simplified block diagram form.

DETAILED DESCRIPTION

Figure 1:
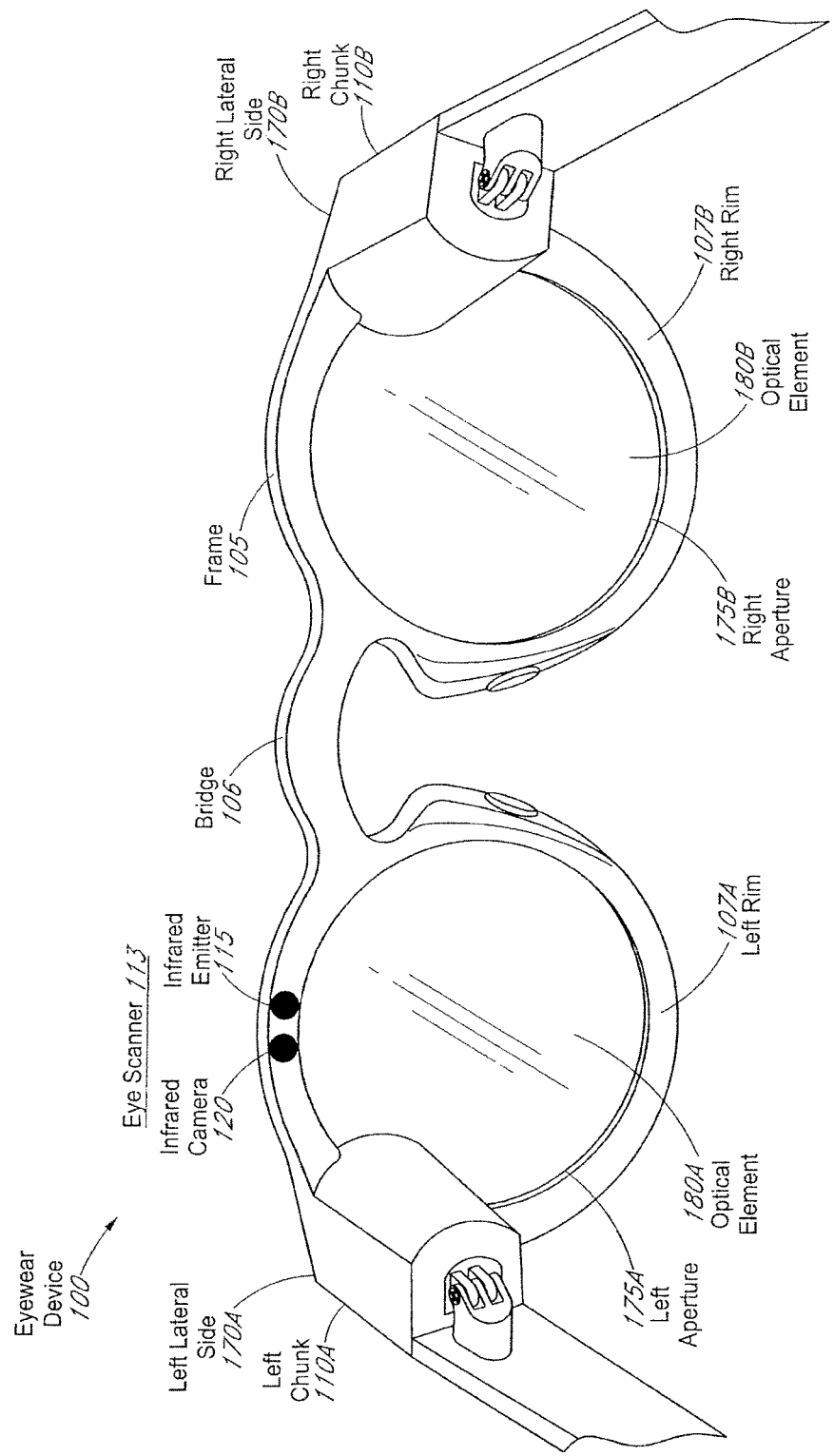
FIG. 1 is a rear view of an example hardware configuration of an eyewear device, which includes an eye scanner on a frame, for use in a system for identifying a user of the eyewear device.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the light or signals.

The orientations of the eyewear device, associated components and any complete devices incorporating an eye scanner such as shown in any of the drawings, are given by way of example only, for illustration and discussion purposes. In operation for a particular variable optical processing application, the eyewear device may be oriented in any other direction suitable to the particular application of the eyewear device, for example up, down, sideways, or any other orientation. Also, to the extent used herein, any directional term, such as front, rear, inwards, outwards, towards, left, right, lateral, longitudinal, up, down, upper, lower, top, bottom and side, are used by way of example only, and are not limiting as to direction or orientation of any optic or component of an optic constructed as otherwise described herein.

In an example, a system includes an eyewear device. The eyewear device includes a frame and a temple connected to a lateral side of the frame. The eyewear device further includes an infrared emitter connected to the frame or the temple to emit a pattern of infrared light. The eyewear device further includes an infrared camera connected to the frame or the temple to emit a pattern of infrared light. The system further includes a processor coupled to the eyewear device, a memory accessible to the processor, and programming in the memory.

Execution of the programming by the processor configures the system to perform functions, including functions to emit, via the infrared emitter, the pattern of infrared light on an eye of a user of the eyewear device. The execution of the programming by the processor further configures the system to capture, via the infrared camera, the reflection variations in the emitted pattern of infrared light on the eye of the user. The execution of the programming by the processor further configures the system to identify a user, or an account, of the eyewear device based on the reflection variations of the emitted pattern of infrared light on the eye of the user.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below.

FIG. 1 is a rear view of an example hardware configuration of an eyewear device 100, which includes an eye scanner 113 on a frame 105, for use in a system for identifying a user of the eyewear device 100. As shown in FIG. 1, the eyewear device 100 is in a form configured for wearing by a user, which are eyeglasses in the example of FIG. 1. The eyewear device 100 can take other forms and may incorporate other types of frameworks, for example, a headgear, a headset, or a helmet.

In the eyeglasses example, eyewear device 100 includes a frame 105 which includes a left rim 107A connected to a right rim 107B via a bridge 106 adapted for a nose of the user. The left and right rims 107A-B include respective apertures 175A-B which hold a respective optical element 180A-B, such as a lens and a display device. As used herein, the term lens is meant to cover transparent or translucent pieces of glass or plastic having curved and flat surfaces that cause light to converge/diverge or that cause little or no convergence/divergence.

Although shown as having two optical elements 180A-B, the eyewear device 100 can include other arrangements, such as a single optical element or may not include any optical element 180A-B depending on the application or intended user of the eyewear device 100. As further shown, eyewear device 100 includes a left chunk 110A adjacent the left lateral side 170A of the frame 105 and a right chunk 110B adjacent the right lateral side 170B of the frame 105. The chunks 110A-B may be integrated into the frame 105 on the respective sides 170A-B (as illustrated) or implemented as separate components attached to the frame 105 on the respective sides 170A-B. Alternatively, the chunks 110A-B may be integrated into temples (not shown) attached to the frame 105.

In the example of FIG. 1, the eye scanner 113 includes an infrared emitter 115 and an infrared camera 120. Visible light cameras typically include a blue light filter to block infrared light detection, in an example, the infrared camera 120 is a visible light camera, such as a low resolution video graphic array (VGA) camera (e.g., 640×480 pixels for a total of 0.3 megapixels), with the blue filter removed. The infrared emitter 115 and the infrared camera 120 are co-located on the frame 105, for example, both are shown as connected to the upper portion of the left rim 107A, As described in further detail below, the frame 105 or one or more of the left and right chunks 110A-B include a circuit board that includes the infrared emitter 115 and the infrared camera 120. The infrared emitter 115 and the infrared camera 120 can be connected to the circuit board by soldering, for example.

Other arrangements of the infrared emitter 115 and infrared camera 120 can be implemented, including arrangements in which the infrared emitter 115 and infrared camera 120 are both on the right rim 107B, or in different locations on the frame 105, for example, the infrared emitter 115 is on the left rim 107A and the infrared camera 120 is on the right rim 107B. In another example, the infrared emitter 115 is on the frame 105 and the infrared camera 120 is on one of the chunks 110A-B, or vice versa. The infrared emitter 115 can be connected essentially anywhere on the frame 105, left chunk 110A, or right chunk 110B to emit a pattern of infrared light. Similarly, the infrared camera 120 can be connected essentially anywhere on the frame 105, left chunk 110A, or right chunk 110B to capture at least one reflection variation in the emitted pattern of infrared light.

The infrared emitter 115 and infrared camera 120 are arranged to face inwards towards the eye of the user with a partial or full field of view of the eye in order to pick up an infrared image of the eye for identify verification. For example, the infrared emitter 115 and infrared camera 120 are positioned directly in front of the eye, in the upper part of the frame 105 or in the chunks 110A-B at either ends of the frame 105.

In an embodiment, the identification establishes globally unique and unambiguous identifiers of the eye, which serves to distinguish a discrete individual from other like and unlike users. In the example, the eye scanner 113 is a retina scanner which uses infrared light illumination (e.g., near-infrared, short-wavelength infrared, mid-wavelength infrared, long-wavelength infrared, or far infrared) to identify the unique blood vessel configuration in the eye, for example, an unperceived beam of low-energy infrared light is cast on the person's eye. Since the pattern of infrared light emitted by the infrared emitter 115 is more easily absorbed by the blood vessels than the surrounding tissue, the amount of light reflected back to the infrared camera 120 varies, which can then be used to uniquely identify the user. Such retinal scanning is an ocular-based biometric technology that uses the unique patterns on a person's retina blood vessels. A user identification algorithm using digital templates encoded from these patterns by mathematical and statistical algorithms allow for pattern recognition of the retina blood vessels or iris and hence the identification of the user. Although identification can be unique, in other embodiments, the identification establishes that the user is part of a group of users. In response to being identified as part of a group, the user can be provided permissions to access, control, or utilize, one more executable software applications or hardware features (e.g., a visible light camera) of the eyewear device 100.

Although not shown in FIG. 1, the eyewear device 100 is coupled to a processor and a memory, for example in the eyewear device 100 itself or another part of the system. Subsequent processing by the eyewear device 100 by the system, for example, using a coupled memory and processor in the system to process the captured image of reflection variations of infrared light from the retina, identifies the unique pattern of the user's eye and thus the particular user of the eyewear device 100.

Alternatively, or additionally, the eye scanner 113 may include an emitter that emits other wavelengths of light besides infrared and the eye scanner 113 further includes a camera sensitive to that wavelength that receives and captures images with that wavelength. For example, the eye scanner 113 may comprise a visible light camera that captures light in the visible light range from the iris. In some examples, such iris recognition can use infrared illumination by the infrared emitter 115 and the infrared camera 120 or a video camera to capture images of the detail-rich, intricate structures of the iris which are visible externally. The eyewear device 100 or the system can subsequently process images captured of the iris using, for example, a coupled memory and processor in the system to process the captured image of visible light from the iris. Such processing of the captured images can identify the unique pattern of the user's eye and thus the particular user of the eyewear device 100.

Figure 2:
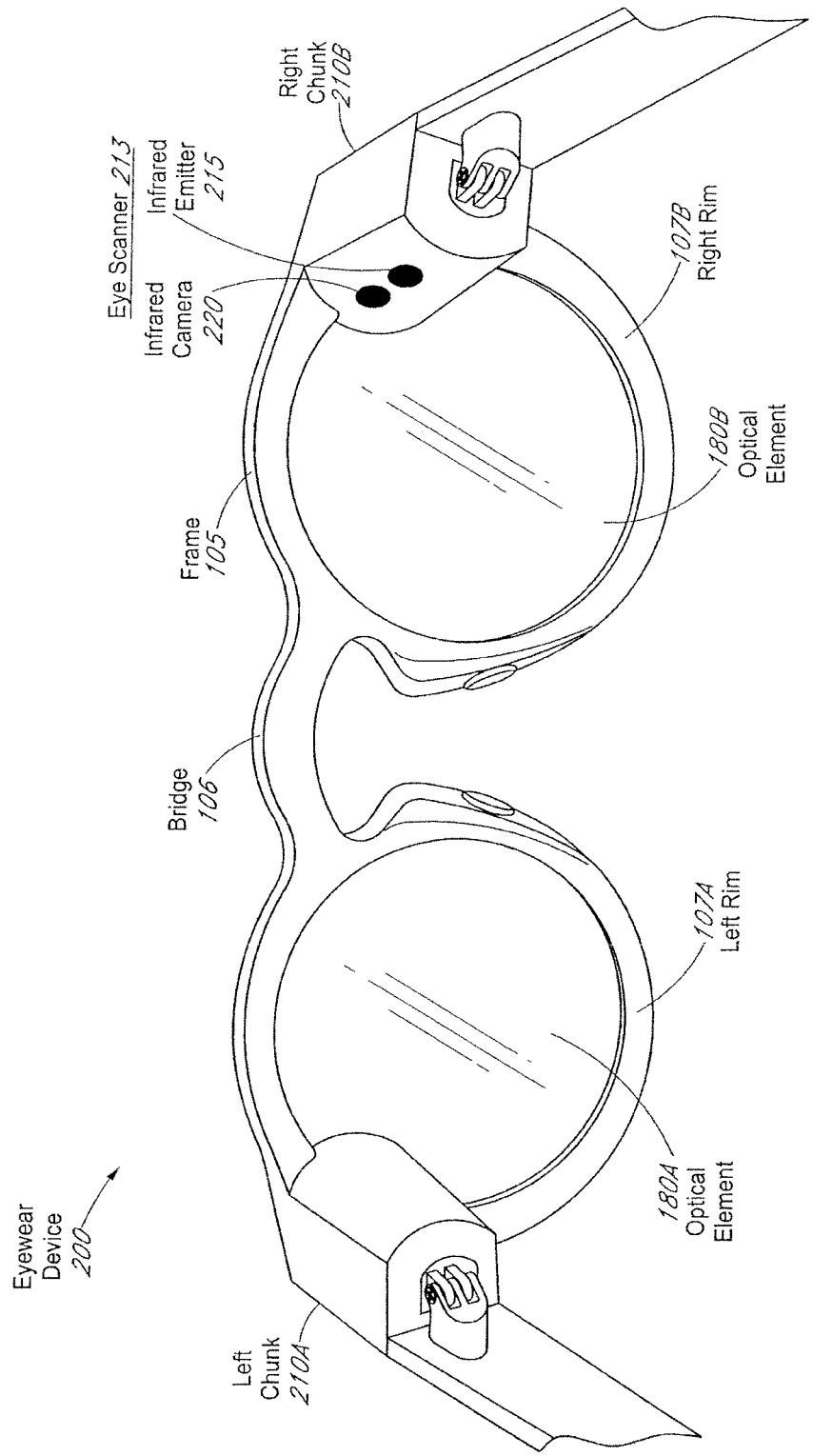
FIG. 2 is a rear view of an example hardware configuration of another eyewear device, which includes an eye scanner on a chunk, for use in a system for identifying a user of the eyewear device.

FIG. 2 is a rear view of an example hardware configuration of another eyewear device 200. In this example configuration, the eyewear device 200 is depicted as including an eye scanner 213 on a right chunk 210B. As shown, the infrared emitter 215 and the infrared camera 220 are co-located on the right chunk 210B. It should be understood that the eye scanner 213 or one or more components of the eye scanner 213 can be located on the left chunk 210A and other locations of the eyewear device 200, for example, the frame 205. Eye scanner 213 has an infrared emitter 215 and infrared camera 220 like that of FIG. 1, but the eye scanner 213 can be varied to be sensitive to different light wavelengths as described previously in FIG. 1.

Similar to FIG. 1, the eyewear device 200 includes a frame 105 which includes a left rim 107A which is connected to a right rim 107B via a bridge 106; and the left and right rims 107A-B include respective apertures which hold a respective optical element 180A-B.

Figure 3:
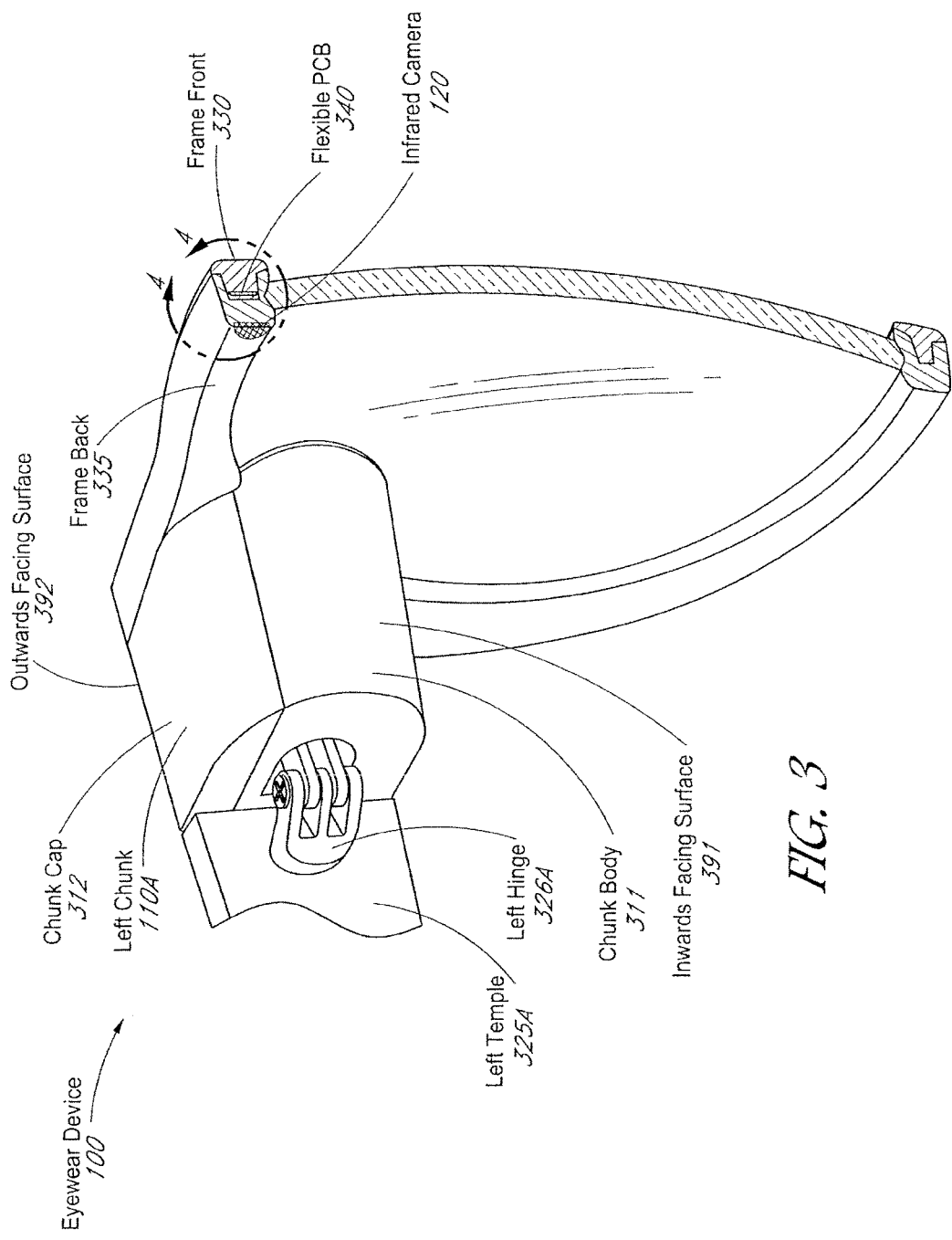
FIG. 3 shows a rear perspective sectional view of the eyewear device of FIG. 1 depicting an infrared camera, a frame front, a frame back, and a circuit board.

FIG. 3 shows a rear perspective view of the eyewear device of FIG. 1 depicting an infrared camera 120, a frame front 330, a frame back 335, and a circuit board. It can be seen that the upper portion of the left rim 107A of the frame 105 of the eyewear device 100 includes a frame front 330 and a frame back 335. The frame front 330 includes a front-facing side configured to face outwards away from the eye of the user. The frame back 335 includes a rear-facing side configured to face inwards towards the eye of the user. An opening for the infrared camera 120 is formed on the frame back 335.

As shown in the encircled cross-section 4-4 of the upper middle portion of the left rim of the frame, a circuit board, which is a flexible printed circuit board (PCB) 340, is sandwiched between the frame front 330 and the frame back 335. Also shown in further detail is the attachment of the left chunk 110A to the left temple 325A via a left hinge 326A. In some examples, components of the eye scanner, including the infrared camera 120, the flexible PCB 340, or other electrical connectors or contacts may be located on the left temple 325A or the left hinge 326A.

In an example, the left chunk 110A includes a chunk body 311, a chunk cap 312, an inwards facing surface 391 and an outwards facing surface 392 (labeled, but not visible). Disposed inside the left chunk 110A are various interconnected circuit boards, such as PCBs or flexible PCBs, that include controller circuits for charging, a battery, inwards facing light emitting diodes (LEDs), and outwards (forward) facing LEDs.

Figure 4:
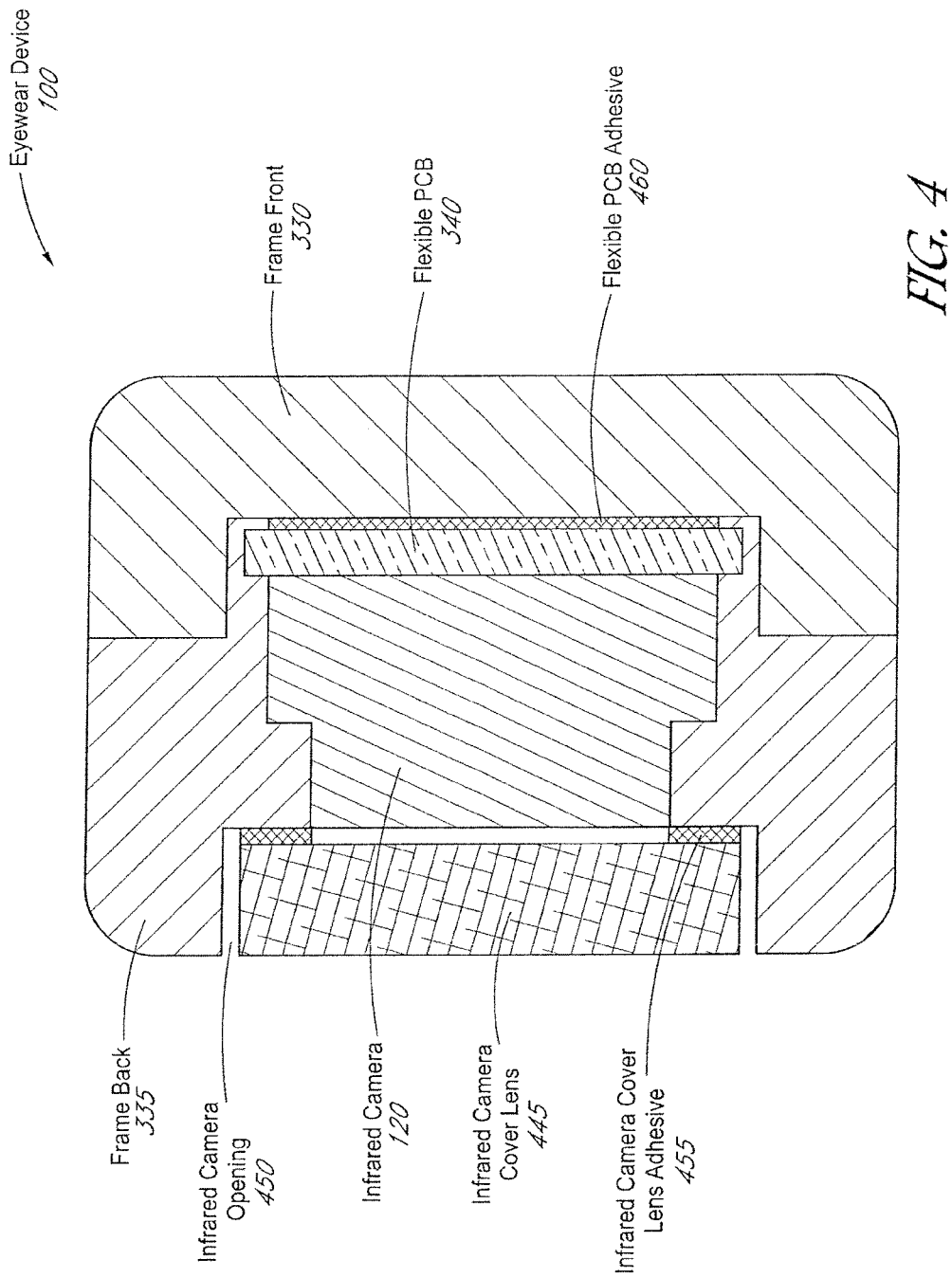
FIG. 4 is a cross-sectional view taken through the infrared camera and the frame of the eyewear device of FIG. 3.

FIG. 4 is a cross-sectional view through the infrared camera 120 and the frame corresponding to the encircled cross-section 4-4 of the eyewear device of FIG. 3. Various layers of the eyewear device 100 are visible in the cross-section of FIG. 4. As shown the flexible PCB 340 is disposed on the frame front 330 and connected to the frame back 335. The infrared camera 320 is disposed on the flexible PCB 340 and covered by an infrared camera cover lens 445. For example, the infrared camera 120 is reflowed to the back of the flexible PCB 340. Reflowing attaches the infrared camera 120 to electrical contact pad(s) formed on the back of the flexible PCB 340 by subjecting the flexible PCB 340 to controlled heat which melts a solder paste to connect the two components. In one example, reflowing is used to surface mount the infrared camera 120 on the flexible PCB 340 and electrically connect the two components. However, it should be understood that through-holes can be used to connect leads from the infrared camera 120 to the flexible PCB 340 via interconnects, for example.

The frame back 335 includes an infrared camera opening 450 for the infrared camera cover lens 445. The infrared camera opening 450 is formed on a rear-facing side of the frame back 335 that is configured to face inwards towards the eye of the user. In the example, the flexible PCB 340 can be connected to the frame front 330 via a flexible PCB adhesive 460. The infrared camera cover lens 445 can be connected to the frame back 335 via infrared camera cover lens adhesive 455. The connection can be indirect via intervening components.

Figure 5:
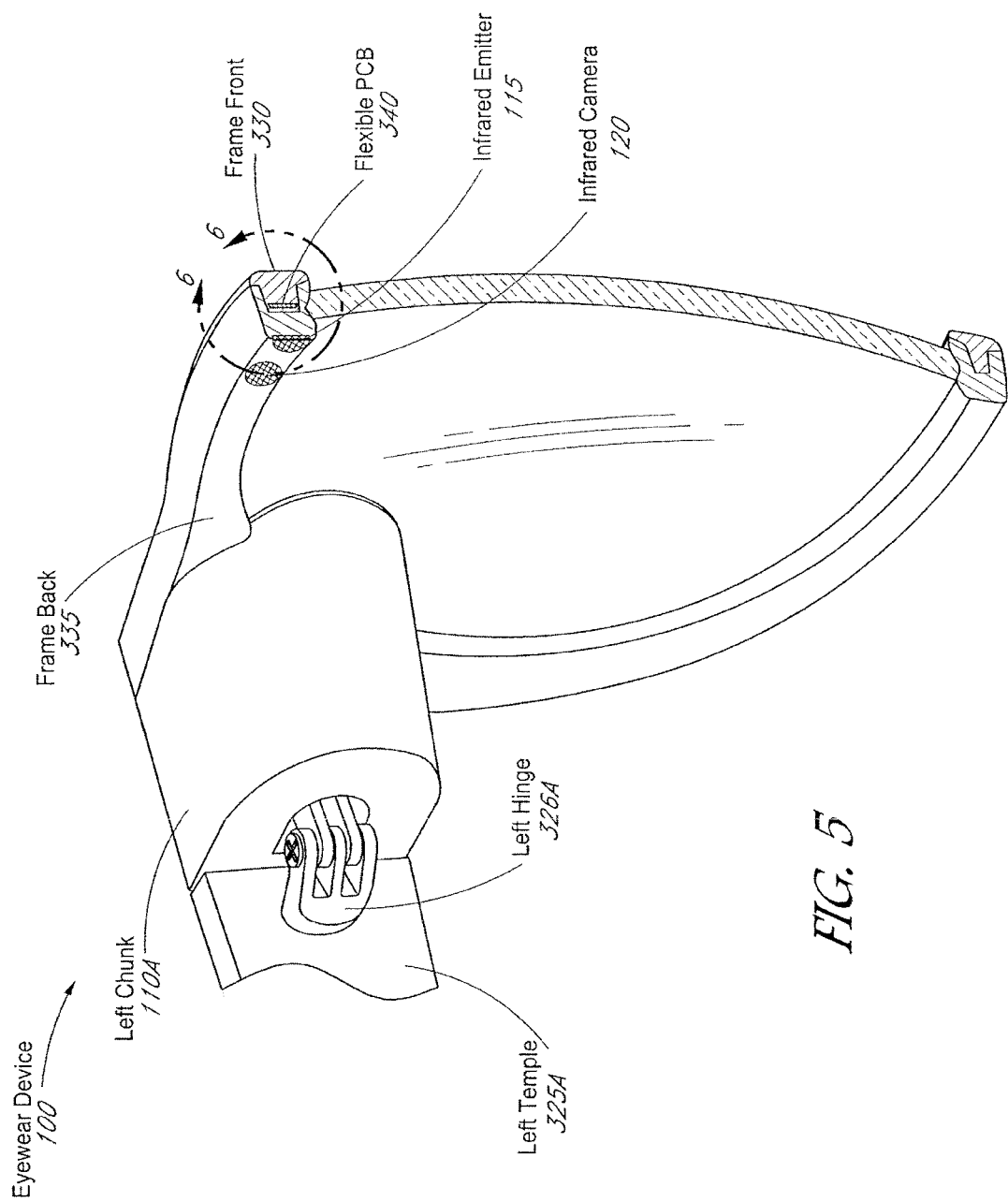
FIG. 5 shows a rear perspective view of the eyewear device of FIG. 1 depicting an infrared emitter, an infrared camera, a frame front, a frame back, and a circuit board.

FIG. 5 shows a rear perspective view of the eyewear device of FIG. 1. The eyewear device 100 includes an infrared emitter 115, infrared camera 120, a frame front 330, a frame back 335, and a circuit board 340. As in FIG. 3, it can be seen in FIG. 5 that the upper portion of the left rim of the frame of the eyewear device 100 includes the frame front 330 and the frame back 335. An opening for the infrared emitter 115 is formed on the frame back 335.

As shown in the encircled cross-section 6-6 in the upper middle portion of the left rim of the frame, a circuit board, which is a flexible PCB 340, is sandwiched between the frame front 330 and the frame back 335. Also shown in further detail is the attachment of the left chunk 110A to the left temple 325A via the left hinge 326A. In some examples, components of the eye scanner, including the infrared emitter 115, the flexible PCB 340, or other electrical connectors or contacts may be located on the left temple 325A or the left hinge 326A.

Figure 6:
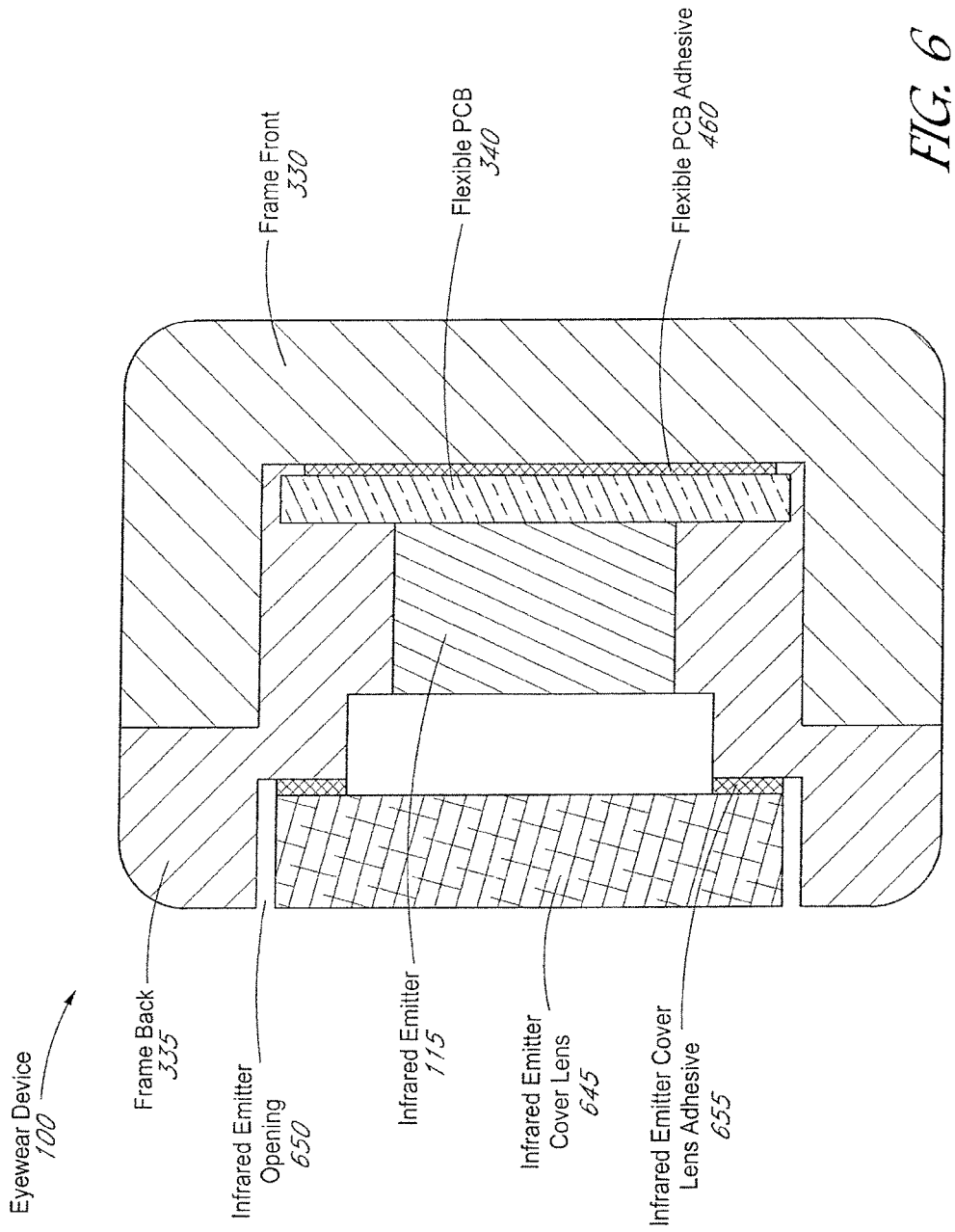
FIG. 6 is a cross-sectional view taken through the infrared emitter and the frame of the eyewear device of FIG. 5.

FIG. 6 is a cross-sectional view through the infrared emitter 115 and the frame corresponding to the encircled cross-section 6-6 of the eyewear device of FIG. 5. Multiple layers of the eyewear device 100 are illustrated in the cross-section of FIG. 6, as shown the frame includes the frame front 330 and the frame back 335. The flexible PCB 340 is disposed on the frame front 330 and connected to the frame back 335. The infrared emitter 115 is disposed on the flexible PCB 340 and covered by an infrared emitter cover lens 645. For example, the infrared emitter 115 is reflowed to the back of the flexible PCB 340. Reflowing attaches the infrared emitter 115 to contact pad(s) formed on the back of the flexible PCB 340 by subjecting the flexible PCB 340 to controlled heat which melts a solder paste to connect the two components. In one example, reflowing is used to surface mount the infrared emitter 115 on the flexible PCB 340 and electrically connect the two components. However, it should be understood that through-holes can be used to connect leads from the infrared emitter 115 to the flexible PCB 340 via interconnects, for example.

The frame back 335 includes an infrared emitter opening 650 for the infrared emitter cover lens 645. The infrared emitter opening 650 is formed on a rear-facing side of the frame back 335 that is configured to face inwards towards the eye of the user. In the example, the flexible PCB 340 can be connected to the frame front 330 via the flexible PCB adhesive 460. The infrared emitter cover lens 645 can be connected to the frame back 335 via infrared emitter cover lens adhesive 655. The coupling can also be indirect via intervening components.

Figure 7:
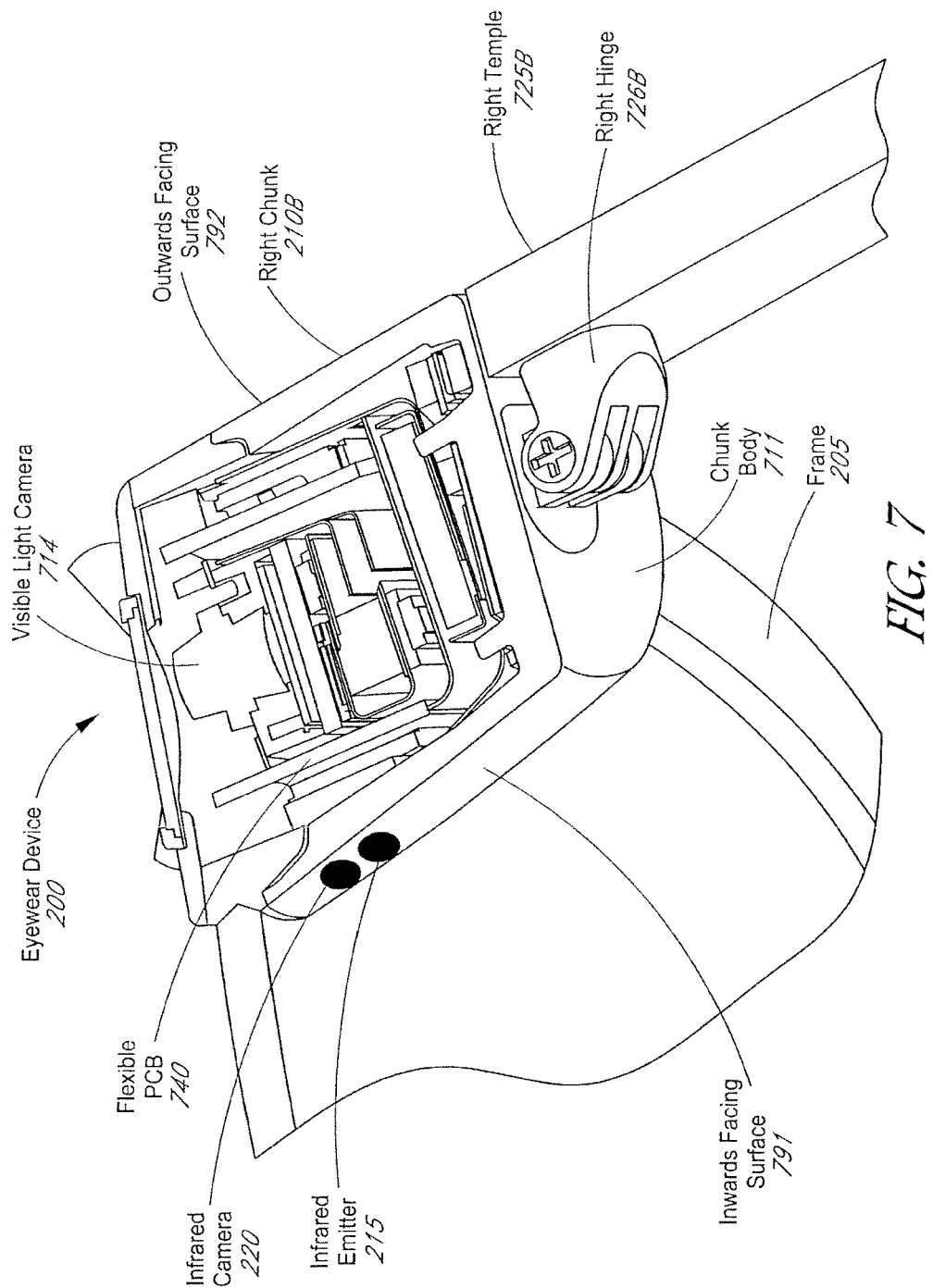
FIG. 7 is a top cross-sectional view of the chunk of the eyewear device of FIG. 2 depicting the infrared emitter, the infrared camera, and a circuit board.

FIG. 7 is a top cross-sectional view of the right chunk 210B of the eyewear device of FIG. 2. As shown, the eyewear device 200 includes the infrared emitter 215, the infrared camera 220, and a circuit board, which may be a flexible PCB 740. The right chunk 210B is connected to a right temple 725B of the eyewear device 200 via the right hinge 726B. In some examples, components of the eye scanner, including the infrared emitter 215 and the infrared camera 220, the flexible PCB 740, or other electrical connectors or contacts may be located on the right temple 725B or the right hinge 726B.

The right chunk 710B includes chunk body 711, an inwards facing surface 791, and an outwards facing surface 792. The right chunk 710B also includes a chunk cap (not shown) like the chunk cap 312 for the left chunk in FIG. 3, but the chunk cap is removed in the cross-section of FIG. 7. Disposed inside the right chunk 210B are various interconnected circuit boards, such as PCBs or flexible PCBs, that include controller circuits for a visible light camera 714, microphone(s), low-power wireless circuitry (e.g., for wireless short range network communication via Bluetooth™), high-speed wireless circuitry (e.g., for wireless local area network communication via WiFi).

The visible light camera 714 is disposed on a circuit board and covered by a visible camera cover lens and has an outwards facing field of view. The frame front, which is connected to the right chunk 210B, and the right chunk 210B can include opening(s) for the visible light camera cover lens. The frame front includes a front-facing side configured to face outwards away from the eye of the user. The opening for the visible light camera cover lens is formed on and through the front-facing side. The infrared emitter 215 and infrared camera 220 have an inwards facing field of view relative to the visible light camera 714 having the outwards facing field of view.

As shown, the infrared emitter 215 and the infrared camera 220 are co-located on the inwards facing surface 791 of the right chunk 210B to point inwards towards the eye of the user. The inwards facing surface 791 can be sloped such that it curves away from the upper portion of the right rim of the frame where the inwards facing surface 791 intersects the right rim and towards the right temple 725B to orient the infrared emitter 215 and infrared camera 220 with an inwards facing field of view and a line of sight of the eye of the user.

The infrared emitter 215 and the infrared camera 220 are coupled to the flexible PCB 740 in a manner that is similar to that shown and described with reference to FIGS. 3-6. For example, the flexible PCB 740 is disposed inside the right chunk 210B between inwards facing surface 791 and the outwards facing surface 792 of the right chunk 210B. Flexible PCB 740 is coupled to one or more other components housed in the right chunk 210B. The infrared emitter 215 is disposed on the flexible PCB 740 and an infrared emitter cover lens covers the infrared emitter 215. The infrared camera 220 is also disposed on the flexible PCB 740 and an infrared camera cover lens covers the infrared emitter 215. Although shown as being formed on the circuit boards of the right chunk 210B, the eye scanner, including the infrared emitter 215 and the infrared camera 220, can be formed on the circuit boards of the left chunk as shown in FIG. 3.

An infrared camera opening and infrared emitter opening are both formed on the inwards facing surface 791 of the right chunk 210B that are configured to face inwards towards the eye of the user. In the example, the flexible PCB 740 can be connected to the inwards facing surface 791 and outwards facing surface 792 via a flexible PCB adhesive. The infrared emitter cover lens and infrared camera cover lens can be connected to the inwards facing surface 791 via a cover lens adhesive. The coupling can also be indirect via intervening components.

Figure 8A:
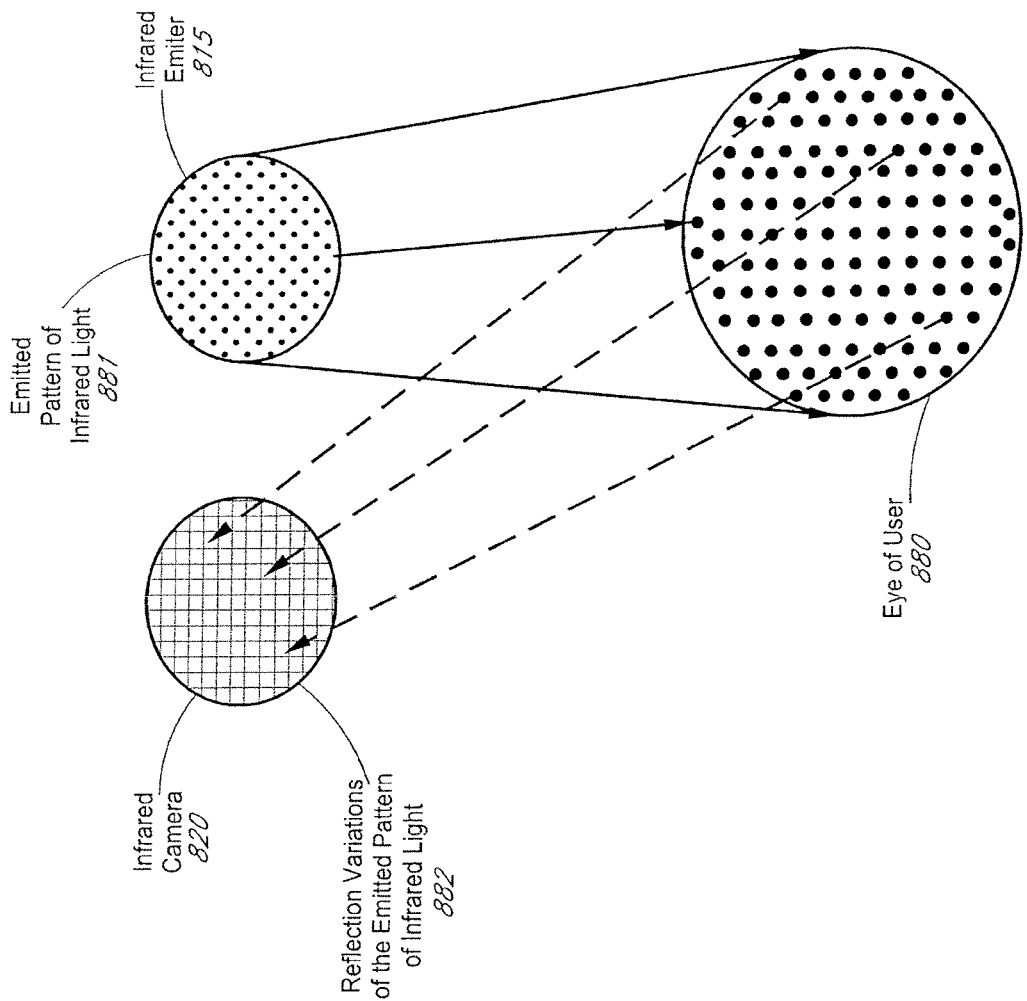
FIG. 8A depicts an example of a pattern of infrared light emitted by an infrared emitter of the eyewear device and reflection variations of the emitted pattern of infrared light captured by the infrared camera of the eyewear device.
Figure 8B:
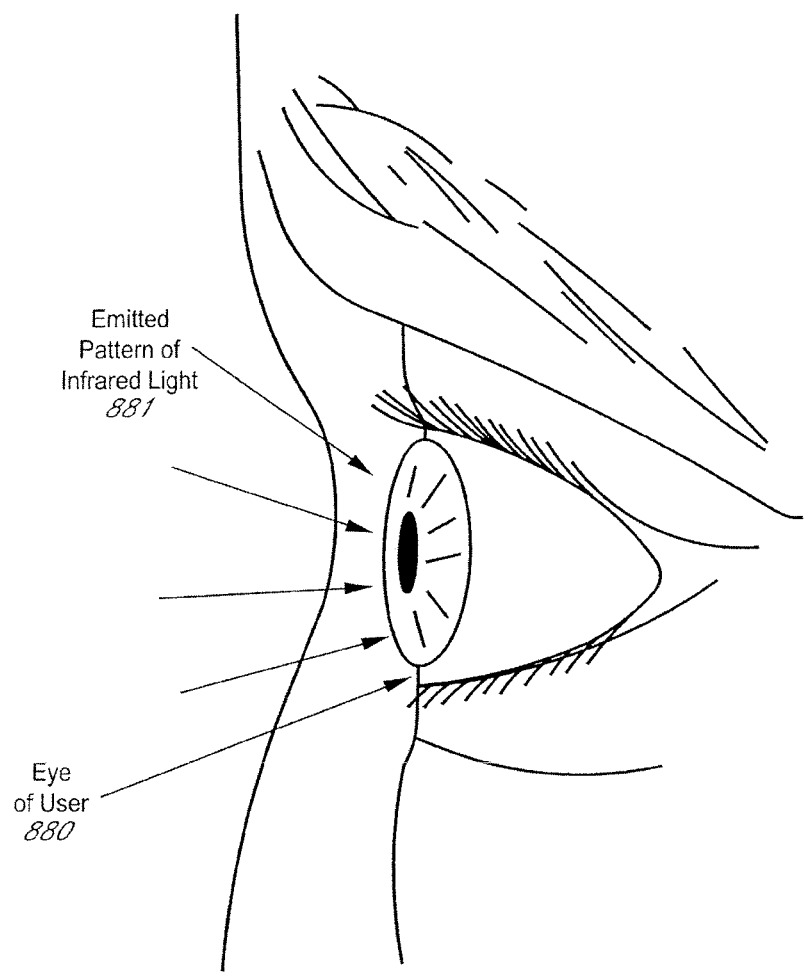
FIG. 8B depicts the emitted pattern of infrared light being emitted by the infrared emitter of the eyewear device in an inwards facing field of view towards an eye of a user.

FIG. 8A depicts an example of a pattern of infrared light emitted by an infrared emitter 815 of the eyewear device and reflection variations of the emitted pattern of infrared light captured by the infrared camera 820 of the eyewear device. FIG. 8B depicts the emitted pattern of infrared light 881 emitted by the infrared emitter 815 of the eyewear device in an inwards facing field of view towards an eye of a user 880.

The pattern of infrared light 881 can be a standardized matrix or beam of pixels that will outline a uniform light trace on the eye of the user 880 (e.g., retina or iris). As noted above, the eye of each user 880 is unique, for example both the retina and iris portions uniquely identify a user. The retina is a thin tissue composed of neural cells located in the posterior portion of the eye. Capillaries that supply the retina with blood form a complex structure that make each user's retina unique to that person. The intricate structures forming the iris are also unique to each person and thus also uniquely identify each user. When the emitted pattern of infrared light 881 strikes the eye of the user 880, the infrared camera 820 captures the reflection variations of the emitted pattern of infrared light 882, which can then be used to uniquely identify the user.

In an example, the emitted pattern of infrared light 881 is an unperceived low-energy infrared beam that shines on the eye with a standardized path. The amount of reflection of the emitted pattern of infrared light 881 varies in different parts of the retina (e.g., retinal blood vessels absorb light more than surrounding tissue) and the iris. Infrared camera 820 captures these reflection variations of the emitted pattern of infrared light 882, which is digitized by the components of the system. For example, the wearable device includes or is coupled to image processor, memory, and processor for digitizing the reflection variations of the emitted pattern of infrared light 882. The reflection variations of the emitted pattern of infrared light 882 can then be compared to a database of captured infrared images of eyes of multiple users to identify the user.

To initially set up the user in the system, the reflection variations of the emitted pattern of infrared light 882 from the user's eye can be stored in the database of captured infrared images, which includes images of eyes of multiple users. The system may then subsequently compare received reflection variations to this database to uniquely identify the user. In an example, when the user is utilizing an eyewear device for the first time, the infrared emitter 815 emits the emitted pattern of infrared light 881 and the infrared camera 820 captures one, two, three, or more images of the reflection variations of the emitted pattern of infrared light 882 in different parts of the user's eye(s). If this is the first time the user has used the system, the system will find no previously captured infrared image exists in the database that matches the currently captured reflection variations of the emitted pattern of infrared light 882. In response to finding no matching captured infrared image exists, the system updates the database to store digitized images of the currently captured reflection variations of the emitted pattern of infrared light 882. During a subsequent use of the eyewear device at a later time, the updated database with the digitized reflection variations that were previously stored in the database are analyzed using algorithms. The algorithms employ mathematical and statistical techniques for pattern recognition to determine whether at least one subsequently captured image of reflection variations of that same user or a different user of the eyewear device matches one or more of the previously captured digitized images that are stored and exist in the database. If a match is found, the identity of the user is verified (e.g., known) and corresponding user account information is retrieved. A chat application stored on a mobile device may be executed by a processor of the mobile device and utilize the corresponding user account information to post or send images and videos captured by a visible light to camera of the eyewear device to the user's account and deliver the images and videos captured by the visible light camera to contacts or associated groups of the verified user in the chat application. Although the above example describes verifying the identity of the user as knowing their identity or identifying an associated user account, some embodiments can include determining that the same person has used the eyewear device before without specifically knowing the identify or account information of the user. It should be understood that the foregoing functionality can be embodied in programming instructions of a user identification application found in one or more components of the system.

Figure 9:
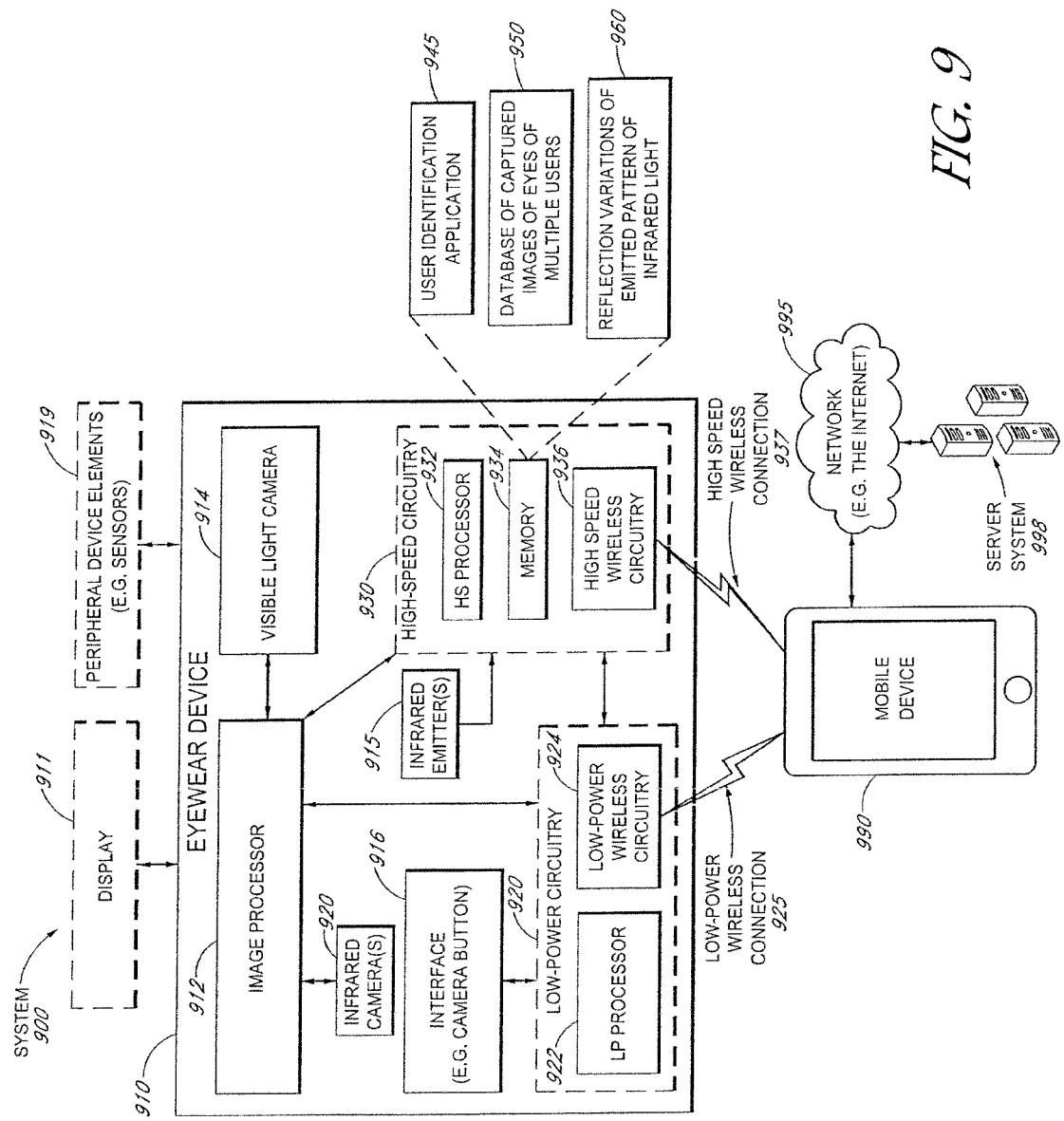
FIG. 9 is a high-level functional block diagram of an example user identification system including the eyewear device, a mobile device, and a server system connected via various networks.

FIG. 9 is a high-level functional block diagram of an example user identification system. The system 900 includes eyewear device 910, mobile device 990, and server system 998. Mobile device 990 may be a smartphone, tablet, laptop computer, access point, or any other such device capable of connecting with eyewear device 910 using both a low-power wireless connection 925 and a high-speed wireless connection 937. Mobile device 990 is connected to server system 998 and network 995. The network 995 may include any combination of wired and wireless connections.

Server system 998 may be one or more computing devices as part of a service or network computing system, for example, that include a processor, a memory, and network communication interface to communicate over the network 995 with the mobile device 990 and eyewear device 910. The memory of the server system 998 can include digital images of the reflection variations of the emitted pattern of infrared light as captured by the eyewear device 910 and transmitted via the depicted networks 925, 937, 995. The memory of the server system 998 can also include a database of captured infrared images of eyes of multiple users and a user identification application to perform functions of the programming described herein. Execution of the programming by the processor of the server system 998 can cause the server system 998 to perform some or all of the functions described herein, for example, to uniquely identify the user of the eyewear device 910 based on the reflection variations.

Mobile device 990 and elements of network 995, low-power wireless connection 925, and high-speed wireless architecture 937 may be implemented using details of the architecture of mobile device 990, for example utilizing the short range XCVRs and WWAN XCVRs of mobile device 990 described in FIG. 10.

System 900 may optionally include additional peripheral device elements 919 and a display 911 integrated with eyewear device 910. Such peripheral device elements 919 may include biometric sensors, additional sensors, or display elements integrated with eyewear device 910. For example, peripheral device elements 919 may include any I/O components including output components, motion components, position components, or any other such elements described herein.

Output components include visual components (e.g., a display such as a plasma display panel (PDP), a light emitting diode (LED) display, a liquid crystal display (LCD), or a projector), acoustic components (e.g., speakers), haptic components (e.g., a vibratory motor), other signal generators, and so forth. The input components include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

For example, the biometric components include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WiFi or Bluetooth™ transceivers to generate positioning system coordinates, altitude sensor components (e.g., altimeters or barometers that detect air pressure from which altitude may be derived), orientation sensor components (e.g., magnetometers), and the like. Such location coordinates can also be received over wireless connections 925 and 937 from the mobile device 990 via the low-power wireless circuitry 924 or high-speed wireless circuitry 936.

Eyewear device 910 includes a visible light camera 914, infrared emitter 915, infrared camera 920, image processor 912, interface 916, low-power circuitry 920, and high-speed circuitry 930. The components shown in FIG. 9 for the eyewear device 910 are located on one or more circuit boards, for example a PCB or flexible PCB, in the chunks or frames. Alternatively or additionally, the depicted components can be located in the temples, hinges, or bridge of the eyewear device 910.

The infrared camera 920 may be a low resolution camera, such as VGA (640×480 resolution), which can provide for low power consumption since fewer pixels equals less power and also allows the camera module package to be small enough to fit into the design of the eyewear device 910, including the frame and chunks. Infrared camera 920 and visible light camera 914 can include digital camera elements such as a charge coupled device, a lens, or any other respective visible or infrared light capturing elements that may be used to capture data.

Interface 916 refers to any source of a user command that is provided to eyewear device 910. In one implementation, interface 916 is a respective physical button on a visible light camera 914, infrared emitter 915, or infrared camera 920 that, when depressed, sends a user input signal from interface 916 to low power processor 922. In some examples, the interface 916 is located on different portions of the eyewear device 910, such as on a different chunk or the frame, but is electrically connected via a circuit board to the visible light camera 914, infrared emitter 915, or infrared camera 920. Interaction with the interface by the user, e.g., tactile input or a depression of a button followed by an immediate release, can be processed by low power processor 922 as a request to capture a single image. A depression of such a camera button for a first period of time may be processed by low-power processor 922 as a request to capture video data while the button is depressed, and to cease video capture when the button is released, with the video captured while the button was depressed stored as a single video file. In certain embodiments, the low-power processor 922 may have a threshold time period between the press of a button and a release, such as 500 milliseconds or one second, below which the button press and release is processed as an image request, and above which the button press and release is interpreted as a video request.

Use of the interface 916 on the eyewear device 910 can be immediately followed by user identification via an eye scanner. For example, the infrared emitter 915 emits a pattern of infrared light and the infrared camera 920 captures reflection variations in the emitted pattern of infrared light by capturing various infrared images. Such user identification can occur prior to each image request or video request via the interface 916 or after a predetermined time interval of usage of the eyewear device 910 has elapsed since the user was previously identified via the eye scanner. The low power processor 922 may make this user identification determination while the video or image processor 912 is booting. In other embodiments, the interface 916 may be a touch screen device, capacitive or resistive strip or array on a circuit board, or any mechanical switch or physical interface capable of accepting user inputs associated with a request for data from the visible light camera 914, infrared emitter 915, or infrared camera 920. In other embodiments, the interface 916 may have a software component, or may be associated with a command received wirelessly from another source.

Image processor 912 includes circuitry to receive signals from the visible light camera 914 and infrared camera 920 and process those signals from the visible light camera 914 and infrared camera 920 into a format suitable for storage in the memory 934. The memory 934 includes various images containing reflection variations 960 of the emitted pattern of infrared light of the eye of the user as captured by the infrared camera 920. In some examples, the memory 934 can also include a database of captured infrared images 950 of eyes of multiple users and a user identification application 945 to perform the functions of the programming described herein, for example the operations outlined in further detail in FIGS. 1-8 and 10-12, for example.

As explained in further detail herein, uniquely identifying the user includes comparing the images containing the reflection variations of the emitted pattern of infrared light 960 of the eye of the user against the database of captured infrared images of eyes of multiple users 950 via a user identification application 945. Such comparison can be done on a device separate from the eyewear device 910, such as a host computer, which includes the mobile device 990 and server system 998. Due to the private nature of data from retina and iris scans, in some examples, identification may occur on the eyewear device 910 alone and in combination with the mobile device 990. However, it should be understood that user identification can occur on essentially any host computer, which includes both the mobile device 990 and server system 998. For example, as shown, the eyewear device 910 can include the processors 922, 932; the memory 934, a user identification application 945 in the memory 934, to perform the functions of the programming to emit and capture as described herein. The host computer 990 and 998 coupled to the eyewear device 910 via the networks 925, 937, and 995 as shown, can include a second processor, a second memory; and the function of the programming to uniquely identify the user of the eyewear device. Where and which components of the depicted system 900 perform the user identification, depends on the security preferences of the user and privacy requirements of the system 900 because storage of such private identification data may be subject to various rules and regulations.

Image processor 912 is structured within eyewear device 910 such that it may be powered on and booted under the control of low-power circuitry 920. Image processor 912 may additionally be powered down by low-power circuitry 920. Depending on various power design elements associated with image processor 912, image processor 912 may still consume a small amount of power even when it is in an off state. This power will, however, be negligible compared to the power used by image processor 912 when it is in an on state, and will also have a negligible impact on battery life. As described herein, device elements in an "off" state are still configured within a device such that low-power processor 922 is able to power on and power down the devices. A device that is referred to as "off" or "powered down" during operation of eyewear device 910 does not necessarily consume zero power due to leakage or other aspects of a system design.

In one example embodiment, image processor 912 comprises a microprocessor integrated circuit (IC) customized for processing sensor data from a visible light camera 914 and an infrared camera 920, along with volatile memory used by the microprocessor to operate. In order to reduce the amount of time that image processor 912 takes when powering on to processing data, a non-volatile read only memory (ROM) may be integrated on the IC with instructions for operating or booting the image processor 912. This ROM may be minimized to match a minimum size needed to provide basic functionality for gathering sensor data from visible light camera 914 and infrared camera 920, such that no extra functionality that would cause delays in boot time are present. The ROM may be configured with direct memory access (DMA) to the volatile memory of the microprocessor of image processor 912. DMA allows memory-to-memory transfer of data from the ROM to system memory of the image processor 912 independent of operation of a main controller of image processor 912. Providing DMA to this boot ROM further reduces the amount of time from power on of the image processor 912 until sensor data from the visible light camera 914 and infrared camera 920 can be processed and stored. In certain embodiments, minimal processing of the camera signal from the visible light camera 914 and infrared camera 920 is performed by the image processor 912, and additional processing may be performed by applications operating on the mobile device 990 or server system 998.

Low-power circuitry 920 includes low-power processor 922 and low-power wireless circuitry 924. These elements of low-power circuitry 920 may be implemented as separate elements or may be implemented on a single IC as part of a system on a single chip. Low-power processor 922 includes logic for managing the other elements of the eyewear device 910. As described above, for example, low power processor 922 may accept user input signals from an interface 916. Low-power processor 922 may also be configured to receive input signals or instruction communications from mobile device 990 via low-power wireless connection 925. Additional details related to such instructions are described further below. Low-power wireless circuitry 924 includes circuit elements for implementing a low-power wireless communication system via a short-range network. Bluetooth™ Smart, also known as Bluetooth™ low energy, is one standard implementation of a low power wireless communication system that may be used to implement low-power wireless circuitry 924. In other embodiments, other low power communication systems may be used.

High-speed circuitry 930 includes high-speed processor 932, memory 934, and high-speed wireless circuitry 936. In the example, the infrared emitter 915 is shown as being coupled to the high-speed circuitry 930 and operated by the high-speed processor 932. However, it should be understood that in some examples the infrared emitter 915 can be coupled to the low-power circuitry 920 such that the infrared emitter 915 is operated by low-power processor 922. For example, a low-energy infrared beam pattern can be emitted by the infrared emitter 915 with relatively few pixels in the matrix which equals less power and can also allow for a small package that fits into the design of the eyewear device 910, including the frame and chunks.

High-speed processor 932 may be any processor capable of managing high-speed communications and operation of any general computing system needed for eyewear device 910. High speed processor 932 includes processing resources needed for managing high-speed data transfers on high-speed wireless connection 937 to a wireless local area network (WLAN) using high-speed wireless circuitry 936. In certain embodiments, the high-speed processor 932 executes an operating system such as a LINUX operating system or other such operating system. In addition to any other responsibilities, the high-speed processor 932 executing a software architecture for the eyewear device 910 is used to manage data transfers with high-speed wireless circuitry 936. In certain embodiments, high-speed wireless circuitry 936 is configured to implement Institute of Electrical and Electronic Engineers (IEEE) 802.11 communication standards, also referred to herein as Wi-Fi. In other embodiments, other high-speed communications standards may be implemented by high-speed wireless circuitry 936.

Memory 934 includes any storage device capable of storing camera data generated by the infrared camera 920, the visible light camera 914, and the image processor 912. While memory 934 is shown as integrated with high-speed circuitry 930, in other embodiments, memory 934 may be an independent standalone element of the eyewear device 910. In certain such embodiments, electrical routing lines may provide a connection through a chip that includes the high-speed processor 932 from the image processor 912 or low-power processor 922 to the memory 934. In other embodiments, the high-speed processor 932 may manage addressing of memory 934 such that the low-power processor 922 will boot the high-speed processor 932 any time that a read or write operation involving memory 934 is needed.

FIG. 10 is a high-level functional block diagram of an example of a mobile device 1090 that communicates via the user identification system of FIG. 9. Shown are elements of a touch screen type of mobile device 1090 having a user identification application 1045 loaded, although other non-touch type mobile devices can be used in the user identification communications and controls under consideration here. Examples of touch screen type mobile devices that may be used include (but are not limited to) a smart phone, a personal digital assistant (PDA), a tablet computer, a laptop computer, or other portable device. However, the structure and operation of the touch screen type devices is provided by way of example; and the subject technology as described herein is not intended to be limited thereto. For purposes of this discussion, FIG. 10 therefore provides a block diagram illustration of the example mobile device 1090 having a touch screen display for displaying content and receiving user input as (or as part of) the user interface. Mobile device 1090 also includes a camera(s) 1070, such as visible light camera(s).

The activities that are the focus of discussions here typically involve data communications related to eye scanning for user identification and security in a portable eyewear device. As shown in FIG. 10, the mobile device 1090 includes at least one digital transceiver (XCVR) 1010, shown as WWAN XCVRs, for digital wireless communications via a wide area wireless mobile communication network. The mobile device 1090 also includes additional digital or analog transceivers, such as short range XCVRs 1020 for short-range network communication, such as via NFC, VLC, DECT, ZigBee, Bluetooth™, or WiFi. For example, short range XCVRs 1020 may take the form of any available two-way wireless local area network (WLAN) transceiver of a type that is compatible with one or more standard protocols of communication implemented in wireless local area networks, such as one of the Wi-Fi standards under IEEE 802.11 and WiMAX.

To generate location coordinates for positioning of the mobile device 1090, the mobile device 1090 can include a global positioning system (GPS) receiver. Alternatively, or additionally the mobile device 1090 can utilize either or both the short range XCVRs 1020 and WWAN XCVRs 1010 for generating location coordinates for positioning. For example, cellular network, WiFi, or Bluetooth™ based positioning systems can generate very accurate location coordinates, particularly when used in combination. Such location coordinates can be transmitted to the eyewear device over one or more network connections via XCVRs 1020.

The transceivers 1010, 1020 (network communication interface) conforms to one or more of the various digital wireless communication standards utilized by modern mobile networks. Examples of WWAN transceivers 1010 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 1010, 1020 provide two-way wireless communication of information including digitized audio signals, still image and video signals, web page information for display as well as web related inputs, and various types of mobile message communications to/from the mobile device 1090 for user identification strategies.

Several of these types of communications through the transceivers 1010, 1020 and a network, as discussed previously, relate to protocols and procedures in support of communications with the eyewear device or the server system for user identity verification utilizing eye scanners, e.g., infrared emitters and infrared cameras, to digitize and process images of the retina or iris of the eye. Such communications, for example, may transport packet data via the short range XCVRs 1020 over the wireless connections 925 and 937 to and from the eyewear device as shown in FIG. 9. Such communications, for example, may also transport data utilizing IP packet data transport via the WWAN XCVRs 1010 over the network (e.g., Internet) 995 shown in FIG. 9. Both WWAN XCVRs 1010 and short range XCVRs 1020 connect through radio frequency (RF) send-and-receive amplifiers (not shown) to an associated antenna (not shown).

The mobile device 1090 further includes a microprocessor, shown as CPU 1030, sometimes referred to herein as the host controller. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The processor 1030, for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU 1030 or processor hardware in smartphone, laptop computer, and tablet.

The microprocessor 1030 serves as a programmable host controller for the mobile device 1090 by configuring the mobile device to perform various operations, for example, in accordance with instructions or programming executable by processor 1030. For example, such operations may include various general operations of the mobile device, as well as operations related to user identification and communications with the eyewear device and server system. Although a processor may be configured by use of hardwired logic, typical processors in mobile devices are general processing circuits configured by execution of programming.

The mobile device 1090 includes a memory or storage device system, for storing data and programming. In the example, the memory system may include a flash memory 1040A and a random access memory (RAM) 1040B. The RAM 1040B serves as short term storage for instructions and data being handled by the processor 1030, e.g. as a working data processing memory. The flash memory 1040A typically provides longer term storage.

Hence, in the example of mobile device 1090, the flash memory 1040A is used to store programming or instructions for execution by the processor 1030. Depending on the type of device, the mobile device 1090 stores and runs a mobile operating system through which specific applications, including user identification application 1045. Applications, such as the user identification application 1045, may be a native application, a hybrid application, or a web application (e.g., a dynamic web page executed by a web browser) that runs on mobile device 1090 to uniquely identify the user. Examples of mobile operating systems include Google Android, Apple iOS (I-Phone or iPad devices), Windows Mobile, Amazon Fire OS, RIM BlackBerry operating system, or the like.

As shown, flash memory 1040A storage device stores a database of captured infrared images of respective eyes of multiple users 1050. The database of captured infrared images of respective eyes of multiple users 1050 is accumulated over time as different users of the eyewear device set up a profile in the user identification system. Initially, each user utilizes the eye scanner 113 to capture various images of an eye. The captured images are then populated into the database of captured infrared images of respective eyes of multiple users 1050 to allow for user identification.

In the example, an eyewear device 100 captures a digital image of reflection variations of the emitted pattern of infrared light 1060 and the captured digital image in the flash memory 1040A. To uniquely identify the user of the eyewear device 100, current reflection variations of an emitted pattern of infrared light 1060 is compared by the processor 1030 to previously captured infrared images of respective eyes of multiple users 1050 within the database to uniquely identify the user of the eyewear device. It will be understood that the mobile device 1090 is just one type of host computer in the user identification system and that other arrangement may be utilized. For example, a server system such as that shown in FIG. 9 may host the database of captured infrared images of respective eyes of multiple users 1050 and perform the comparison to make the unique user identification determination. Where the database of captured infrared images of respective eyes of multiple users 1050 and the reflection variations of the emitted pattern of infrared light 1060 is stored and processed can vary depending on the security preferences of the user and the system requirements.

The user identification application 1045 includes programming functions to populate the database with captured infrared images of respective eyes of multiple users 1050 and to uniquely identify the user. For example, the programming functions may include comparing the digital image of reflection variations of the emitted pattern of infrared light 1060 with the database of captured infrared images of respective eyes of multiple users 1050. In addition, any of the user identification functionality described herein for the eyewear device, mobile device, and server system can be embodied in one more applications as described previously.

Figure 11A:
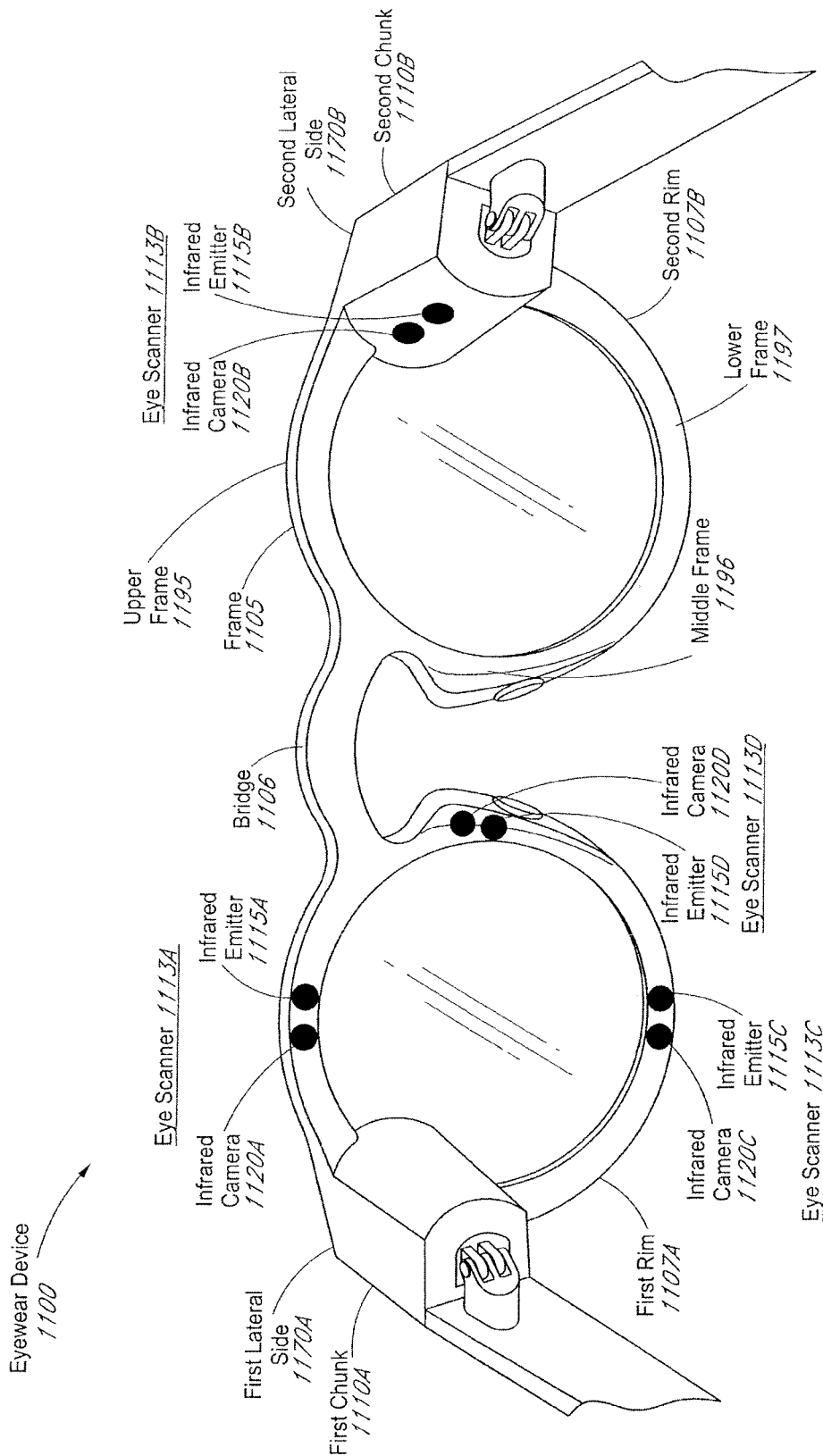
FIG. 11A shows various alternate locations for the eye scanner on the eyewear device, which can be used individually or in combination.

FIG. 11A shows various alternate locations for the eye scanner on the eyewear device, which can be used individually or in combination. A shown, multiple eyewear scanners 1113A-D can be included in the eyewear device 1100 to reduce errors in the user identification determination and to determine a direction in which the user is looking (e.g., line of sight) for eye tracking. In the example, there a four eye scanners 1113A-D, and each eye scanner 1113A-D includes a respective infrared emitter 1115A-D and infrared camera 1120A-D.

As shown, the frame 1105 includes opposing first and second lateral sides 1170A-B. A first chunk 1110A is integrated into the first lateral side 1170A of frame 1105. A second chunk 1110B is integrated into the second lateral side 1170B of frame 1105. A circuit board (not shown) spans the first chunk 1110A, the frame 1105, and the second chunk 1110B. The frame 1105 of the eyewear device 1100 includes an upper frame portion 1195, a middle frame portion 1196, and a lower frame portion 1197.

As depicted in FIG. 11A, eye scanner 1113A is located on the first rim 1107A on the upper frame portion 1195. Eye scanner 1113B is located on the second chunk 1110B. Eye scanner 1113C is located on the first rim 1107A on the lower frame portion 1197. Eye scanner 1113D is located on the first rim on the middle frame portion 1196.

Eyewear device 1100 includes a first eye scanner 1113A that includes a first infrared emitter 1115A and a first infrared camera 1120A. Eyewear device 1100 also includes a second eye scanner 1113B that includes a second infrared emitter 1115B and a second infrared camera 1120B. The second infrared emitter 1115B is connected to the frame 1105 or the at least one chunk 1110A-B to emit a second emitted pattern of infrared light. The second infrared camera 1120B is connected to the frame 1105 or the at least one chunk 1110A-B to capture reflection variations in the second emitted pattern of infrared light. It should be understood that the first and second eye scanners can include any combination of locations, or number of eye scanners 1113A-D shown in FIG. 11A, including one, two, three, or four of the eye scanners 1113A-D. Additionally, the eye scanners 1113A-D can be located on other portions of the eyewear device 1100, including the first chunk 1110A; upper, middle, and lower portions 1195-1197 of the second rim 1107B; the bridge 1106, or the temples.

Execution of the programming by a processor of a user identification system, for example in the eyewear device 1100 or a coupled mobile device or server system, configures the system to perform functions. In an example, the eyewear device 1110 emits, via the second infrared emitter 1115B, the second emitted pattern of infrared light on a second eye of the user of the eyewear device 1110; captures, via the second infrared camera 1120B, reflection variations in the second emitted pattern of infrared light on a second eye of the user. Based on the reflection variations of the second emitted pattern of infrared light on the second eye of the user, the system determines a direction of a line of sight of the eyes of the user for eye tracking.

In another example, the eyewear device 1100 emits, via the second infrared emitter 1115B, the second emitted pattern of infrared light on a different portion of the eye of the user of the eyewear device 1100 than the first infrared emitter 1115A. The eyewear device 1100 captures, via the second infrared camera 1115B, the reflection variations in the second emitted pattern of infrared light on the different portion of the eye of the user. Based on the reflection variations of the second emitted pattern of infrared light on the different portion of the eye of the user, the system uniquely identifies the user of the eyewear device 1100 based on the reflection variations of the second emitted pattern of infrared light on the different portion of the eye of the user. The second emitted pattern of infrared light can be the same or different from the first pattern of infrared light emitted by the first infrared emitter 1115A. The second infrared emitter 1115B and the second infrared camera 1120B can be co-located on the frame 1105 or the at least one chunk 1110A-B as shown in FIG. 11. Although not shown in FIG. 11A, the first infrared emitter 1115A and the infrared camera 1120A can be co-located on a first chunk 1110A. The second infrared emitter 1115B and the second infrared camera 1120B can be co-located on a second chunk 1110B.

As described and depicted in FIG. 1 and shown in FIG. 11A, the frame 1105 of the eyewear device 1100 includes first and second eye rims 1107A-B that have respective apertures to hold a respective optical element and the first and second eye rims 1107A-B are connected by a bridge 1106. In an example, the first infrared emitter 1115A and the first infrared camera 1120A are co-located on the first eye rim 1107A. Although not shown in FIG. 11B, the second infrared emitter 1115B and the second infrared camera 1120B can be co-located on the second eye rim 1107B, including on the upper frame portion 1195, middle frame portion 1196, and lower frame portion 1197.

Figure 11B:
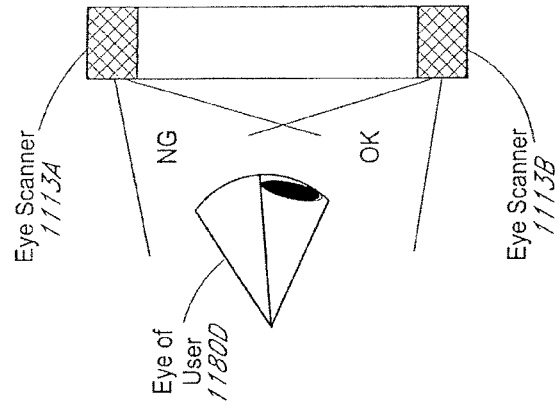
FIGS. 11B, 11C, and 11D illustrate the effects of the various alternate locations on the eyewear device with respect to different orientations of the eye of the user.
Figure 11C:
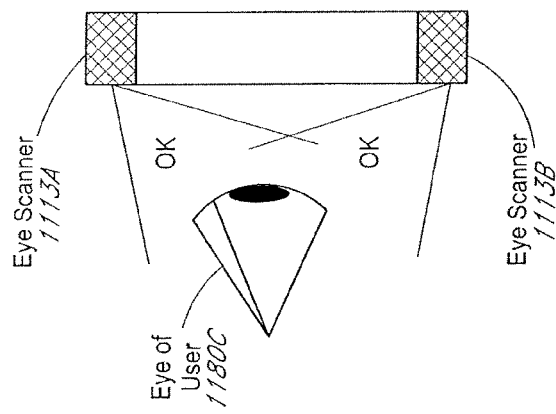
Figure 11D:
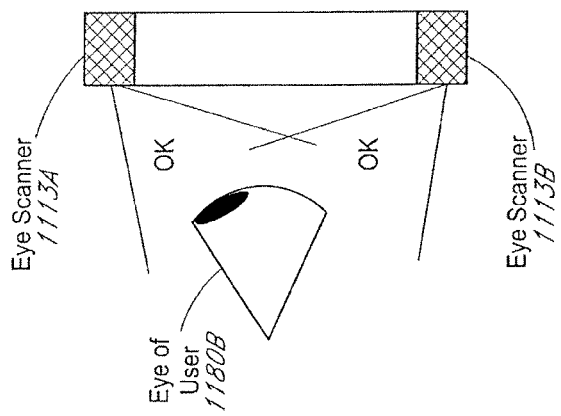

FIGS. 11B-D illustrate the effects of the various alternate locations on the eyewear device with respect to different orientations of the eye of the user. In FIG. 11B, the eye of the user 1180B is looking up. Accordingly, placement of the eye scanner 1113A, such as the infrared emitter and infrared camera, on either the upper frame portion (e.g., top frame on the rims, bridge, etc.) or a chunk can accurately capture an image of the retina or iris of the eye of the user 1180B looking up. Also, placement of the eye scanner 1113B on a lower frame portion (e.g., bottom frame) of the eyewear device also accurately captures an image of the retina or iris of the eye of the user 1180B looking up. Hence both fields of view are depicted as suitable (OK).

In FIG. 11C, the eye of the user 1180C is looking straight ahead. In this scenario, again placement of the eye scanner 1113A on either the upper frame portion or a chunk can accurately capture an image of the retina or iris of the eye of the user 1180C looking straight ahead. Also, placement of the eye scanner 1113B on the lower frame portion of the eyewear device accurately captures an image of the retina or iris of the eye of the user 1180C looking straight ahead.

In FIG. 11D, the eye of the user 1180D is looking down. In this orientation of the eye of the user 1180D, placement of the eye scanner 1113A, on either the upper frame portion or a chunk may be insufficient because the eyelid of the user 1180D can block the infrared camera. Hence the field of view is depicted as not good (NG). However, placement of the eye scanner 1113B on the lower frame portion of the eyewear device can accurately capture an image of the retina or iris of the eye of the user 1180D looking down. Thus, having multiple eye scanners 1113A-B on the eyewear device can improve performance of the user identification system by improving accuracy and reducing errors in eye scanning. In addition, multiple eye scanners 1113A-B can be used for eye tracking directional information, for example, to detect where the user is looking (left, right, up, down, east, west, north, south, etc.).

In an example, location coordinates of the user of the eyewear device can also be generated by the location sensor components of the eyewear device or a mobile device being carried by the user that is in communication via the connections 925 and 937 as described in FIGS. 9-10. With the eye tracking directional information along with the location coordinates of the user, specific content can be delivered to the eyewear device. For example, if the user is walking down the street and looking at a store, the eyewear device can be loaded with information about the particular store for delivering coupons for monetizing purposes.

According to some embodiments, an "application" or "applications" are program(s) that execute functions defined in the programs. Various programming languages can be employed to create one or more of the applications, structured in a variety of manners, such as object-oriented programming languages (e.g., Objective-C, Java, or C++) or procedural programming languages (e.g., C or assembly language). In a specific example, a third party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third party application can invoke API calls provided by the operating system to facilitate functionality described herein.

Figure 12:
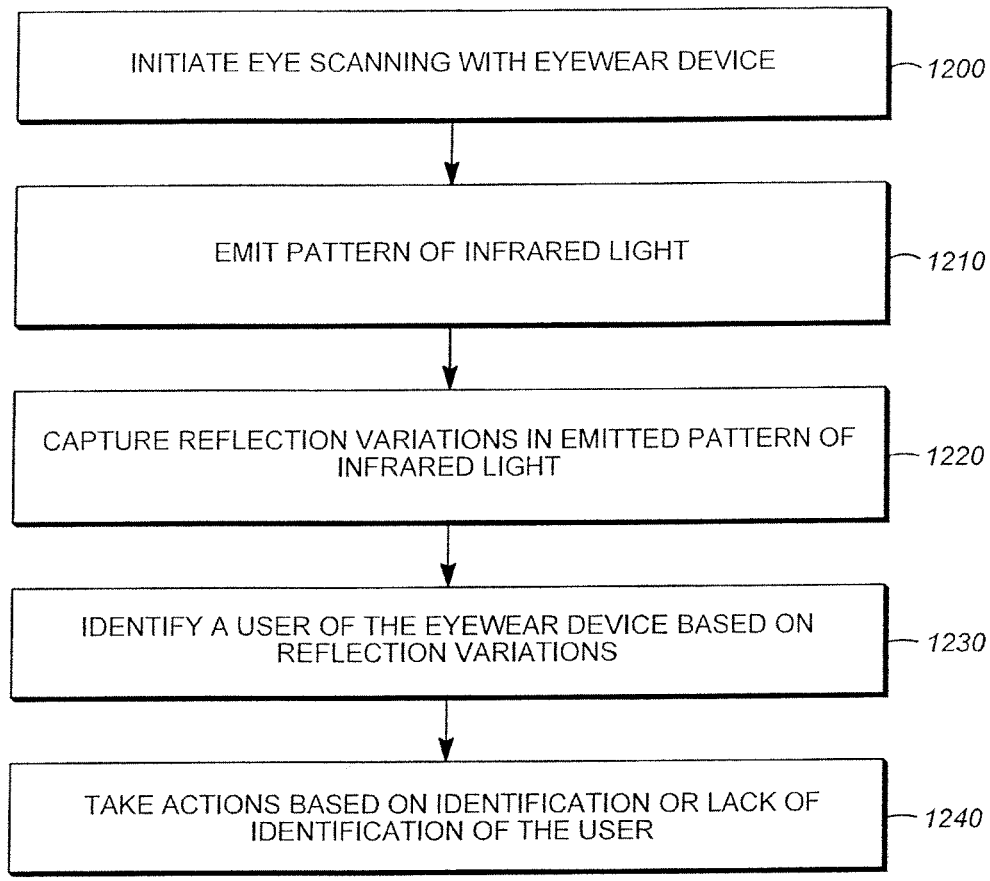
FIG. 12 is a flowchart of the operation of the eyewear device and other components of the user identification system.

FIG. 12 is a flowchart of the operation of the eyewear device and other components of the user identification system. As noted above, utilizing the eyewear devices and protocols and procedures of the user identification system described herein, the identity of a user can be verified. Although shown as occurring serially, the blocks of FIG. 12 may be reordered or parallelized depending on the implementation.

Beginning in block 1200, eyewear device initiates scanning of the eye. In one example, eye scanning is initiated when a user puts the eyewear device on, for example, over the user's eyes. Such wearing of the eyewear device can be detected after the eyewear device detects that the temples have been be unfolded via an open/close sensor (e.g., magnetic contacts) mounted on a circuit board that is coupled to the temples and hinges. Or, for example, a capacitive strip on the bridge, temples, or other portions of the eyewear device may detect that the eyewear device is being worn by the user. In response to detecting wearing of the eyewear device, for example, for a predetermined time, the remaining blocks of FIG. 12 may be executed. In another example, eye scanning is initiated within a predetermined time period after the eyewear device is powered on. In another example, eye scanning is initiated when another function of the eyewear device is triggered, for example, a different software executable application is accessed which requires appropriate user or group permissions.

Eye scanning can be initiated when hardware is accessed on the eyewear device, for example, when a button is pressed to capture images or a video via the visible light camera or another user interface or component of the eyewear device is utilized. In another embodiment, the eyewear device initiates an eye scan under certain conditions (e.g., detection of motion from an on-board accelerometer or gyroscope) or detecting modification of positional location coordinates via a GPS receiver or other positioning system.

Continuing to block 1210, the eye scanner of the eyewear device emits a pattern of infrared light. As described in detail previously, the infrared emitter emits the pattern of infrared light which can be a standardized matrix or beam of pixels that will outline a uniform light trace on the eye of the user (e.g., retina or iris). The emitted pattern can be an unperceived low-energy infrared beam that shines on the eye with a standardized path.

Proceeding to block 1220, the eyewear device captures reflection variations in the emitted pattern of infrared light. As outlined above, the amount of reflection of the emitted pattern of infrared light varies in different parts of the retina (e.g., retinal blood vessels absorb light more than surrounding tissue) and the iris. The infrared camera captures these reflection variations of the emitted pattern of infrared light, which is digitized by the eyewear device.

Moving to block 1230, a user of the eyewear device is identified based on the currently captured digitized reflection variations, on one or more devices of the user identification system, such as the eyewear device, mobile device, or server system. A database with the digitized reflection variations that were previously stored are analyzed using algorithms to compare against the currently captured digitized reflection variations. The algorithms employ mathematical and statistical techniques for pattern recognition to determine whether the currently captured reflection variations of the user of the eyewear device matches one or more of the previously captured digitized images that are stored and exist in the database. If a match is found, the identity of the user is verified (e.g., known) and corresponding user account information is retrieved.

Finishing now in block 1240, actions are taken based on identification or lack of identification of the user. For example, the eyewear device and associated mobile device may be unlocked and profile settings or configurations of the eyewear device can be loaded based on the associated user account. In one example, access to certain software executable applications and associated hardware can be granted, such as the visible light camera, of the eyewear device. In another example, the eyewear device may automatically pair with the mobile device associated with the identified user account in response to user identification. In some embodiments, the user may be automatically be logged into user accounts on third party software applications, for example, an application store or chat application. In other examples, the identity of the user or the identity of the user account can be included in the metadata of images or videos captured by the visible light camera along with geolocation data.

If the user is not identified (e.g., no match is found in the database), then the eyewear device and mobile device may remain locked and inaccessible. For example, the eyewear device and mobile device lock down and the account associated with the devices receives messages that there was a non-matching access to the devices. Alternatively, if this is the first time the user utilizes the user identification system, the system will find no previously captured infrared image exists in the database with digitized reflection variations that match the currently captured reflection variations of the emitted pattern of infrared light. In response to finding no matching captured infrared image exists, the system may update the database to store digitized images of the currently captured reflection variations of the emitted pattern of infrared light. The system may then allow the user access to the eyewear device and mobile device, for example, and request that the user set up a user account.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A system comprising:
   an eyewear device including:
   a frame;
   a first temple connected to a first lateral side of the frame;
   a second temple connected to a second lateral side of the frame;
   a first infrared emitter connected to the frame or the first temple to emit a first pattern of infrared light;

a second infrared emitted connected to the frame, the first temple, or the second temple to emit a second pattern of infrared light;
a first infrared camera connected to the frame or the first temple to capture reflection variations in the first emitted pattern of infrared light; and
a second infrared camera connected to the frame, the first temple, or the second temple to capture reflection variations in the second emitted pattern of infrared light;
a processor coupled to the eyewear device;
a memory accessible to the processor; and
programming in the memory, wherein execution of the programming by the processor configures the system to perform functions, including functions to:
emit, via the first infrared emitter, the first pattern of infrared light on an eye of a user of the eyewear device;
capture, via the first infrared camera, the reflection variations in the first emitted pattern of infrared light on the eye of the user;
emit, via the second infrared emitter, the second emitted pattern of infrared light on a different portion of the eye of the user of the eyewear device than the infrared emitter;
capture, via the second infrared camera, the reflection variations in the second emitted pattern of infrared light on the different portion of the eye of the user; and
verify identity of a user of the eyewear device based on the reflection variations of the first and second emitted patterns of infrared light on the eye of the user.

2. The system of claim 1, wherein the first infrared emitter and first infrared camera and are co-located on the frame.

3. The system of claim 1, wherein the eyewear device includes a first chunk that is integrated into or connected to the frame and wherein the first infrared emitter and the first infrared camera are co-located on the first chunk.

4. The system of claim 3, wherein the first chunk includes a circuit board that includes the first infrared emitter and the first infrared camera.

5. The system of claim 4, wherein the circuit board is a flexible printed circuit board.

6. The system of claim 4, wherein:
the frame includes:
a frame front; and
a frame back; and
the flexible printed circuit board is disposed between the frame front and the frame back.

7. The system of claim 6, wherein:
the first infrared camera is disposed on the circuit board and is covered by an infrared camera cover lens; and
the frame back includes a first opening for the infrared camera cover lens.

8. The system of claim 7, wherein:
the first infrared emitter is disposed on the circuit board and is covered by an infrared emitter cover lens; and
the frame back includes a second opening for the infrared emitter cover lens.

9. The system of claim 8, wherein
the eyewear device further includes:
a visible light camera disposed on the circuit board and covered by a visible camera cover lens, the visible light camera having an outwards facing field of view;
the frame front includes a third opening for the visible light camera cover lens; and the first infrared emitter and the first infrared camera have an inwards facing field of view relative to the visible light camera having the outwards facing field of view.

10. The system of claim 9, wherein:
the frame front includes a front-facing side configured to face outwards away from the eye of the user; and
the frame back includes a rear-facing side configured to face inwards towards the eye of the user;
the first opening for the infrared camera cover lens and the second opening for the infrared emitter cover lens are on the rear-facing side; and
the third opening for the visible light camera cover lens is on the front-facing side.

11. The system of claim 4, wherein the eyewear device includes a second chunk that is integrated into or connected to the frame and wherein:
the frame includes opposing first and second lateral sides;
the first chunk is connected to or integrated with the frame on the first lateral side;
the second chunk is connected to or integrated with the frame on the second lateral side; and
the circuit board extends through the frame from the first chunk to the second chunk.

12. The system of claim 1, wherein the second emitted pattern of infrared light is the same or different from the pattern of infrared light.

13. The system of claim 1, wherein:
the second infrared emitter and the second infrared camera are co-located on the frame, the other temple, or a chunk that is integrated into or connected to the frame on the other lateral side.

14. The system of claim 1, wherein:
the infrared emitter and the infrared camera are co-located on a first chunk that is integrated into or connected to the frame on the lateral side; and
the second infrared emitter and the second infrared camera are co-located on a second chunk that is integrated into or connected to the frame on the lateral side.

15. The system of claim 13, wherein:
the frame includes first and second eye rims that have respective apertures to hold a respective optical element;
the first and second eye rims are connected by a bridge;
the first infrared emitter and the first infrared camera are co-located on the first eye rim; and
the second infrared emitter and the second infrared camera are co-located on the second eye rim.

16. The system of claim 1, wherein the processor comprises a first and second processor, wherein the memory comprises a first and second memory, and wherein:
the eyewear device includes the first processor, the first memory, and the functions of the programming in the memory to emit and capture; and
the system further comprises a host computer coupled to the eyewear device via a network, the host computer including:
the second processor;
the second memory; and
the function of the programming in the memory to verify the identity of the user of the eyewear device.

17. The system of claim 16, wherein:
the host computer is a mobile device;
the network is a wireless short-range network or a wireless local area network;

the host computer includes a storage device having a database of captured infrared images of respective eyes of multiple users; and the function of the programming to verify the identity of the user of the eyewear device includes comparing the reflection variations of the emitted pattern of infrared light on the eye of the user with the captured infrared images.

18. A method for identifying a user of an eyewear device, the eyewear device including a first infrared emitter, a second infrared emitter, a first camera, and a second camera, the method comprising:

emitting, via the first infrared emitter, a first pattern of infrared light on an eye of a user of the eyewear device;

capturing, via the first infrared camera, reflection variations in the first emitted pattern of infrared light on the eye of the user;

emitting, via the second infrared emitter, the second emitted pattern of infrared light on a different portion of the eye of the user of the eyewear device than the infrared emitter;

capturing, via the second infrared camera, the reflection variations in the second emitted pattern of infrared light on the different portion of the eye of the user; and verifying identity of the user of the eyewear device based on the reflection variations of the first and second emitted patterns of infrared light on the eye of the user.

19. A non-transitory computer readable medium including instructions for implementing functions when executed by a processor of an eyewear device including a first infrared emitter, a second infrared emitter, a first camera, and a second camera, the functions comprising:

emitting, via the first infrared emitter, a first pattern of infrared light on an eye of a user of the eyewear device;

capturing, via the first infrared camera, reflection variations in the first emitted pattern of infrared light on the eye of the user;

emitting, via the second infrared emitter, the second emitted pattern of infrared light on a different portion of the eye of the user of the eyewear device than the infrared emitter;

capturing, via the second infrared camera, the reflection variations in the second emitted pattern of infrared light on the different portion of the eye of the user; and verifying identify of the user of the eyewear device based on the reflection variations of the first and second emitted patterns of infrared light on the eye of the user.

* * * * *